(12) United States Patent
Craven

(10) Patent No.: US 12,489,282 B1
(45) Date of Patent: Dec. 2, 2025

(54) ELECTRICAL BOX ASSEMBLY HAVING SHIMS SECURING A COVER PLATE

(71) Applicant: Magnefficient LLC, Castle Pines, CO (US)

(72) Inventor: Joseph Powell Craven, Castle Pines, CO (US)

(*) Notice: Subject to any disclaimer, the term of this patent is extended or adjusted under 35 U.S.C. 154(b) by 315 days.

(21) Appl. No.: 17/963,960

(22) Filed: Oct. 11, 2022

Related U.S. Application Data

(60) Provisional application No. 63/254,445, filed on Oct. 11, 2021.

(51) Int. Cl.
*H02G 3/14* (2006.01)
*H02G 3/08* (2006.01)

(52) U.S. Cl.
CPC ............... *H02G 3/14* (2013.01); *H02G 3/081* (2013.01)

(58) Field of Classification Search
None
See application file for complete search history.

(56) References Cited

U.S. PATENT DOCUMENTS

| | | | |
|---|---|---|---|
| 9,030,830 B2* | 5/2015 | Hsu | G06F 1/16 361/740 |
| 9,048,647 B2* | 6/2015 | Myers | H02G 3/123 |
| 9,300,121 B2* | 3/2016 | Myers | H02G 3/123 |
| 9,891,667 B2* | 2/2018 | Jung | G04G 21/04 |
| 10,237,995 B2* | 3/2019 | Nakano | B60R 16/0238 |
| 11,812,577 B2* | 11/2023 | Uchida | H05K 7/1447 |
| 2014/0048303 A1* | 2/2014 | Myers | H02G 3/123 29/428 |

* cited by examiner

*Primary Examiner* — Imani N Hayman
*Assistant Examiner* — Rashen E Morrison
(74) *Attorney, Agent, or Firm* — Brownstein Hyatt Farber Schreck, LLP

(57) ABSTRACT

A magnetic cover plate mounting assembly may comprise a magnetic cover plate assembly and one or more magnetic shims. The one or more magnetic shims may include a first magnetic shim with a first recessed area and a second magnetic shim defining a second recessed area and may be positioned between an electrical box and an electrical assembly. A number of magnets may be placed within the first and the second recessed areas. A magnetic cover plate assembly may additionally be provided and may be coupled to the magnetic shims. The magnetic cover plate assembly may have a screwless front surface.

20 Claims, 35 Drawing Sheets

ELECTRICAL BOX ASSEMBLY HAVING SHIMS SECURING A COVER PLATE

CROSS-REFERENCE TO RELATED APPLICATION(S)

This application is a nonprovisional patent application of and claims the benefit under 35 U.S.C. § 119 (e) of U.S. Provisional Patent Application No. 63/254,445, filed Oct. 11, 2021, and titled "Electrical Box Assembly Having Shims Securing a Cover Plate", the contents of which are incorporated herein by reference in its entirety.

TECHNICAL FIELD

The described embodiments generally relate to cover plate mounting assemblies. In particular, the described embodiments relate to a cover plate mounting assembly including a cover plate assembly and shims that are magnetically and/or frictionally coupled with the cover plate assembly to cover an electrical outlet and/or electrical box.

BACKGROUND

Buildings and other structures commonly include a number of electrical components, including electric lights, power outlets, and electric ventilation components. In order to provide power to these electrical components, electrical wiring is commonly installed within building walls or around associated structural framing.

Electrical boxes are typically located within walls and provide support and protection for certain electrical assemblies, such as switch assemblies (e.g., light switches) and electrical receptacles (e.g., outlets). In this way, electrical boxes act as an enclosure for switches and/or electrical receptacles and portions of the associated wiring.

An electrical box is typically covered by a cover plate which covers an opening of the electrical box, thereby preventing a user from coming into contact with live electrical wires or other electrical components. A cover plate has one or more screw holes, which are used to couple the cover plate to an electrical assembly or, in the absence of an electrical assembly, an electrical box. The screws may be misaligned, particularly when the underlying electrical box is misaligned, resulting in the cover plate having a skewed appearance. Further, as the screw holes extend through the cover plate, at least a portion of the screws (e.g., the screw heads) are clearly visible to anyone looking at the cover plate.

SUMMARY

This summary is provided to introduce a selection of concepts that are further described herein. This summary is not intended to identify key features or essential features of the claimed subject matter, nor is it intended to be used as an aid in determining the scope of the claimed subject matter.

In some embodiments, a magnetic cover plate mounting assembly may be provided. The magnetic cover plate mounting assembly may comprise a first magnetic shim configured to be positioned between an electrical box and an electrical assembly. The first magnetic shim may define a first wing region comprising a first magnetic component, a second wing region comprising a second magnetic component, and a first recessed area positioned between the first wing region and the second wing region and defining a first thinned portion configured to accommodate a first end of the electrical assembly. The magnetic cover plate mounting assembly may further comprise a second magnetic shim configured to be positioned between the electrical box and the electrical assembly. The second magnetic shim may define a third wing region comprising a third magnetic component, a fourth wing region comprising a fourth magnetic component, and a second recessed area positioned between the third wing region and the fourth wing region and defining a second thinned portion configured to accommodate a second end of the electrical assembly, the second end opposite from the first end. The magnetic cover plate mounting assembly may further comprise a magnetic cover plate assembly defining at least one hole configured to receive a portion of the electrical assembly therethrough and comprising a magnetic attachment system configured to couple with the first and the second magnetic components of the first magnetic shim and the third and the fourth magnetic components of the second magnetic shim.

The first magnetic shim may comprise a spring cleat having a compressed state and an uncompressed state and configured to engage a rim of the magnetic cover plate assembly. The magnetic cover plate assembly may be configured to apply a force to the spring cleat during coupling of the magnetic cover plate assembly to the first magnetic shim, the force configured to transition the spring cleat from the uncompressed state to the compressed state. The spring cleat may inhibit decoupling of the magnetic cover plate assembly from the first magnetic shim after the magnetic cover plate assembly is coupled with the first magnetic shim.

The magnetic cover plate mounting assembly may further comprise a locking pin positioned within a locking cavity of the magnetic cover plate assembly. The first magnetic shim may further comprise a locking magnet positioned at a base portion of the first magnetic shim. The locking magnet may attract the locking pin to cause the locking pin to engage the first magnetic shim, thereby securing the magnetic cover plate assembly to the first magnetic shim.

The first magnetic shim may be magnetically retained with the magnetic cover plate assembly when the locking pin is in a locked position and the locking pin may transition to an unlocked position when an external magnetic force is applied to the locking pin.

The electrical assembly may be coupled to the electrical box by at least one screw. The magnetic cover plate assembly may define a screw cavity formed into the rear surface of the magnetic cover plate assembly, the screw cavity configured to receive a portion of the at least one screw therein. The screw cavity may not extend through the magnetic cover plate assembly to the front surface.

The first magnetic component may be a first magnet positioned within the first wing region, the second magnetic component may be a second magnet positioned within the second wing region, the third magnetic component may be a third magnet positioned within the third wing region, and the fourth magnetic component may be a fourth magnet positioned within the fourth wing region. The electrical assembly may include at least one of an electrical switch or an electrical receptacle.

In some embodiments, a magnetic shim may be positioned between an electrical box and an electrical assembly. The magnetic shim may define a first wing region comprising a first magnetic component, a second wing region comprising a second magnetic component, and a recessed area positioned between the first wing region and the second wing region and defining a thinned portion configured to receive a first end of the electrical assembly. The first magnetic component may be a first magnet and the second magnetic component may be a second magnet. The first magnetic component may be formed from a ferromagnetic material and the second magnetic component may be formed from the ferromagnetic material.

The magnetic shim may further define a notch configured to permit access to a screw coupling the electrical assembly to the electrical box. The magnetic shim may comprise a spring cleat having a compressed state and an uncompressed state. The spring cleat may transition from the compressed state to the uncompressed state when the magnetic shim is installed with a magnetic cover plate assembly The electrical assembly may be one of an electrical switch or an electrical receptacle.

In some embodiments, a magnetic cover plate mounting assembly may comprise a magnetic shim configured to be positioned between an electrical box and an electrical assembly. The magnetic shim may define a first wing region comprising a first magnetic component, a second wing region comprising a second magnetic component, and a recessed area positioned between the first wing region and the second wing region and defining a thinned portion configured to accommodate a first end of the electrical assembly. The magnetic cover plate mounting assembly may further comprise a magnetic cover plate assembly defining at least one hole configured to receive a portion of the electrical assembly therethrough and comprising a magnetic attachment portion configured to couple with the first and the second magnetic components of the magnetic shim.

The magnetic attachment portion may comprise four magnets and each of the four magnets may be positioned at a respective corner of a rear surface of the magnetic cover plate assembly.

The magnetic cover plate may further define a raised rim portion surrounding the rear surface, the raised rim portion configured to come into contact with a wall. The magnetic attachment portion may comprise two magnets. A first magnet of the two magnets may be positioned at a first end of the at least one hole and a second magnet of the two magnets may be positioned at a second end of the at least one hole, the second end opposite the first end.

A cover plate mounting assembly includes a cover plate configured to cover an electrical box and at least a portion of an electrical assembly. The cover plate may define a cover portion defining an exterior side of the cover plate and an interior side of the cover plate opposite the exterior side, a first engagement feature positioned at a first edge of the cover portion along the interior side of the cover plate, and a second engagement feature positioned at a second edge of the cover portion along the interior side of the cover plate. The cover plate mounting assembly may further include a first shim configured to be positioned between the electrical box and a first mounting tab of the electrical assembly, the first shim defining a third engagement feature configured to engage the first engagement feature of the cover plate, and a second shim configured to be positioned between the electrical box and a second mounting tab of the electrical assembly, the second shim include a base portion and a biasing member coupled to the base portion and configured to engage the second engagement feature to impart a biasing force to the cover plate to force the third engagement feature into engagement with the first engagement feature. The first engagement feature may define a first angled surface, and the second engagement feature may define a second angled surface configured to contact the first angled surface.

The second shim may include a unitary polymer structure defining both the biasing member and the base portion. The second shim may include a unitary metal structure defining both the biasing member and the base portion.

The cover plate may define an attachment mechanism, and the cover plate mounting assembly may further include an additional cover plate configured to releasably engage the attachment mechanism to releasably couple the additional cover plate to the cover plate.

The biasing member may be a first biasing member, and the cover plate may define a fourth engagement feature positioned at the second edge of the cover portion along the exterior side of the cover plate. The cover plate may also define a second biasing member positioned at the first edge of the cover portion along the exterior side of the cover plate. The cover plate mounting assembly may further include an additional cover plate defining a barrier portion defining an exterior side of the additional cover plate and an interior side of the additional cover plate, a fifth engagement feature positioned at a first edge of the barrier portion along the interior side of the additional cover plate and configured to engage the fourth engagement feature of the cover plate, and a sixth engagement feature positioned at a second edge of the barrier portion along the interior side of the additional cover plate and configured to engage the second biasing member. The second biasing member may be configured to impart an additional biasing force to the additional cover plate to force the fifth engagement feature into engagement with the fourth engagement feature.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

Figure 1A:
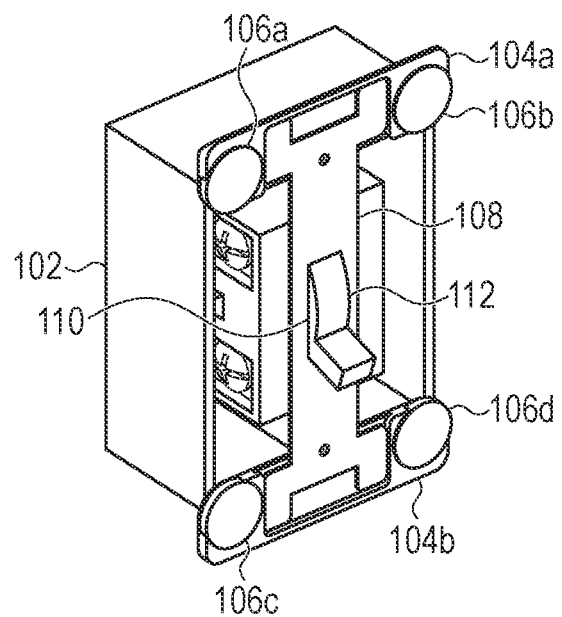
FIGS. 1A-1C illustrate an example magnetic cover plate mounting assembly, such as described herein.

The use of the same or similar reference numerals in different figures indicates similar, related, or identical items. Additionally, it should be understood that the proportions and dimensions (either relative or absolute) of the various features and elements (and collections and groupings thereof) and the boundaries, separations, and positional relationships presented, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Cover plates are generally used to protect users from certain electrical components associated with switch or outlet assemblies. Switch or outlet assemblies may include components that a user interacts with, such as levers or buttons. For example, if a user wants to turn on a light, a user may move a lever or press a button to close a circuit and begin supplying power to the light. However, certain components of a switch or outlet assembly may be dangerous due to the presence of electricity being supplied to the switch or outlet. Cover plates have traditionally been used to separate the interactable components, such as a lever or a button, from electrically active components, such as conductive wires. This may provide a safe environment where users are unlikely to be shocked from the electrically active components while interacting with the interactive components of the switch or outlet assembly.

Conventional cover plates suffer from a number of deficiencies. For example, a user may periodically want to remove a cover plate for various purposes, such as to replace, repair, maintain, and/or clean an electrical box, a nearby wall surface, and/or a switch or outlet assembly. Conventionally, screws are used to fasten the cover plate to a switch or outlet assembly that is mounted within an electrical box, or to the electrical box itself. Due to the use of such screws, conventional cover plates may be difficult to remove, particularly by elderly and/or inexperienced users. For example, the presence of these screws requires the user to use a tool, such as a screwdriver, which may not be immediately accessible. The use of screws additionally complicates installation/removal processes as the screws may be difficult to properly align and may damage the cover plate, a surrounding structure, and/or the switch or outlet assembly. With time, screws may strip or rust, making the removal of the cover plate more difficult. Additionally, in order to apply or remove a screw, the screw head must be externally accessible. Visible screw heads may also mar an aesthetic appearance of a cover plate.

There is a need, therefore, for a cover plate mounting structure that protects users from potentially dangerous and/or unsightly electrically active components while being both easily removeable when intended and detachment-resistant when removal is not intended. Additionally, a cover plate that does not require physical fasteners, such as screws, may be desired to improve an aesthetic appearance of the cover plate (e.g., by eliminating any visible screw heads).

The instant disclosure generally relates to cover plate mounting assemblies which may comprise multiple components such as cover plate assemblies (also referred to as cover plates) and one or more shims. In some implementations, the shims and cover plates may include engagement features configured to secure the cover plate to the underlying electrical box. In this way, the cover plate may resist removal, but may otherwise be easily installed. Further, the engagement features may be configured to align the cover plate with respect to an installation surface. In this way, even in cases where an underlying electrical box is misaligned, the cover plate may be installed so as to be aligned with the installation surface.

In some implementations, the cover plate mounting assemblies may be magnetic cover plate mounting assemblies and may include a magnetic cover plate and one or more magnetic shims. As used herein, the term magnetic may refer to materials or objects that are capable of forming an attraction via magnetism. For example, both magnets and materials that are attracted to magnets (e.g., ferromagnetic materials) may be considered magnetic materials, and components that use magnets or materials that are attracted to magnets may be referred to as magnetic components. The instant description refers to various examples in which components, such as magnetic shims and magnetic cover plates, have a particular arrangement of magnets and magnetically attractable materials. It will be understood that different arrangements of magnetic materials may also be used to achieve the same or similar outcome (e.g., magnetic attraction between two objects or components).

The one or more magnetic shims may be positioned on respective ends of an electrical box which acts as an enclosure for one or more electrical assemblies, such as switch assemblies or outlet assemblies. A magnetic cover plate may additionally be provided. The magnetic cover plate may include one or more magnets (and/or other materials that are capable of forming a magnetic attachment to a magnet as described herein) and may be magnetically attracted to a mounting surface via the one or more magnetic shims through magnetic attraction forces. The magnetic cover plate may lack holes for fasteners, such as screws, and may appear substantially uniform across the front surface.

Aspects of the provided disclosure utilize magnets as attachment mechanisms to couple a magnetic cover plate to one or more magnetic shims. The one or more magnetic shims may be positioned (e.g., clamped) between an electrical assembly (e.g., a switch/outlet assembly) and an electrical box. The one or more magnetic shims may be clamped between the electrical assembly and the electrical box to retain it or them in position. As such, the one or more magnetic shims may not require additional fasteners such as screws, nails, and so on. In some cases, such as where an electrical box is empty or otherwise lacks an electrical assembly such as a switch therein, the one or more magnetic shims may be secured to the electrical box (e.g., via screws or other fasteners).

As the one or more magnetic shims are held in place by the electrical assembly, a corresponding magnetic cover plate may attach to, or detach from, the one or more magnetic shims entirely through magnetic forces. The magnetic forces may stably hold the magnetic cover plate over the electrical box and may resist removal. However, a user can still detach the magnetic cover plate without tools by applying a sufficient force to the magnetic cover plate, such as by pulling the magnetic cover plate away from the one or more magnetic shims. This manner of attachment and detachment may be performed without the use of tools such as screwdrivers. A first set of magnets may be provided on first and second magnetic shims and a second set of magnets may be provided on the cover plate. The respective sets of magnets may face each other with a reverse polarity, such that the magnetic cover plate is attracted to the magnetic shims, and vice versa.

As discussed with respect to the corresponding figures below, the magnets may be positioned at certain locations on the magnetic cover plate and/or the one or more magnetic shims to securely fasten the magnetic cover plate to the shims. Additionally, the magnets may be arranged to ensure that the magnetic cover plate is flush on a wall or other supporting structure, thereby sealing potentially dangerous and/or unsightly internal components while providing a fastener-free appearance. The magnetic cover plate and/or the magnetic shims may additionally be adjustable with respect to the electrical box and/or switch assembly. In the event that the electrical box and/or switch assembly is poorly installed (e.g., not straight with respect to a wall or trim), the adjustability of the magnetic cover plate and/or the magnetic shims may allow a user to offset any crooked or uneven installation.

Multiple types of magnetic cover plate mounting assemblies, including one or more magnetic shims and/or magnetic cover plates, may be provided depending on a type of electrical assembly (e.g., an outlet assembly or a light switch assembly), physical dimensions of the associated electrical box, a location of the electrical box (e.g., a height with respect to a floor), a voltage rating of the electrical assembly, and so on. It is readily appreciated that magnetic covers and/or magnetic shims of varying appearances, sizes, shapes, and so on, may be provided in accordance with the below disclosure.

These and other embodiments are discussed below with reference to FIGS. 1A-17B. However, those skilled in the art will readily appreciate that the detailed description given herein with respect to these figures is for explanatory purposes only and should not be construed as limiting.

Figure 1B:
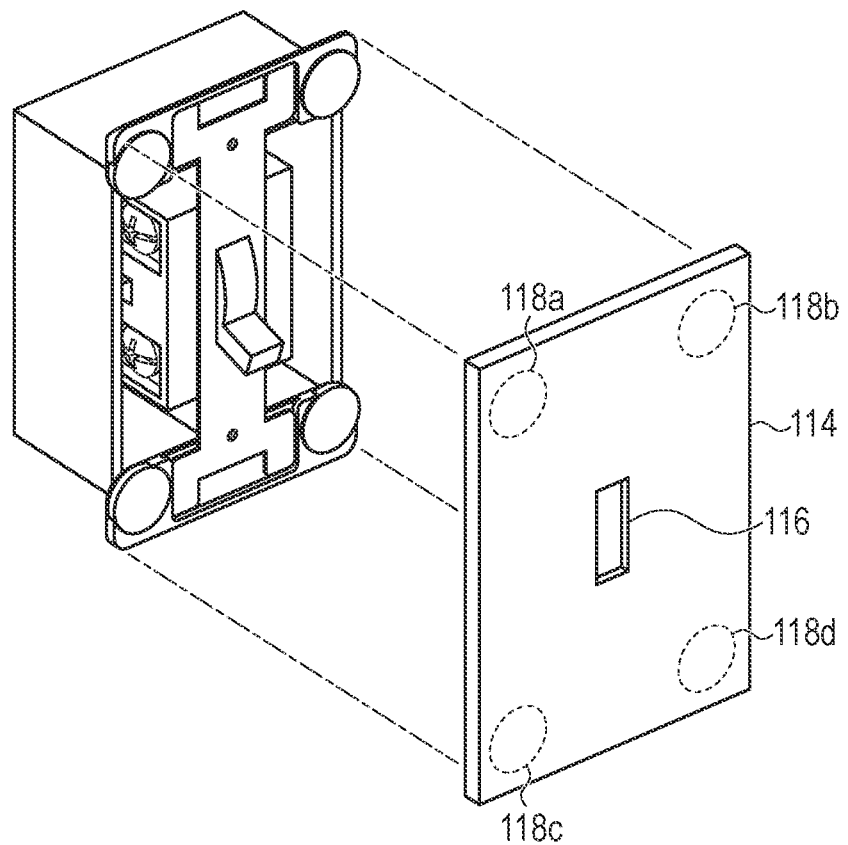
Figure 1C:
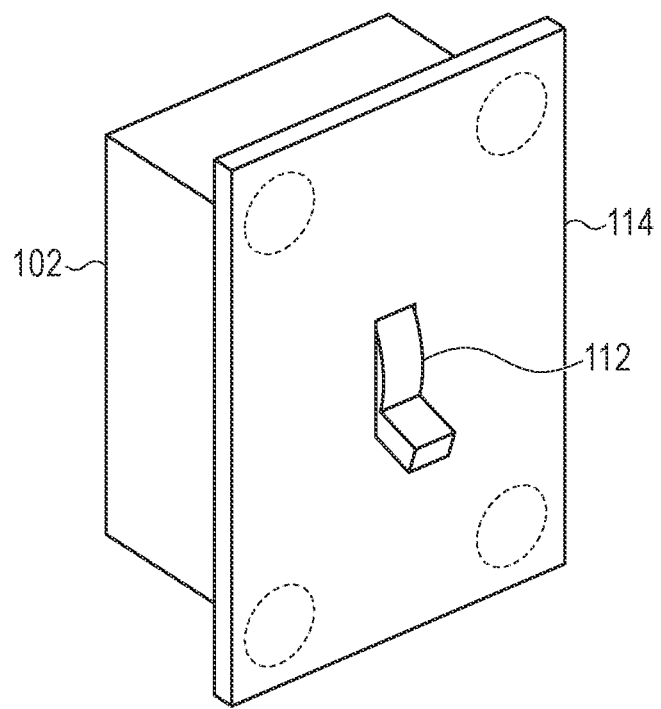

FIGS. 1A-1C illustrate a magnetic cover plate mounting assembly comprising a first magnetic shim 104*a*, a second magnetic shim 104*b*, and a magnetic cover plate 114. FIG. 1A illustrates the first and second magnetic shims 104*a*/104*b* installed between an electrical box 102 and an electrical assembly 108, FIG. 1B illustrates an installation operation where the magnetic cover plate 114 is being coupled to the first and second magnetic shims 104*a*/104*b*, and FIG. 1C illustrates the magnetic cover plate 114 coupled to the first and second magnetic shims 104*a*/104*b* (e.g., a completed installation condition).

FIG. 1A depicts a first magnetic shim 104*a* and a second magnetic shim 104*b*. The first magnetic shim 104*a* and the second magnetic shim 104*b* may be positioned on an electrical box 102. The first and second magnetic shims 104*a*/104*b* may each have a substantially rectangular shape with rounded corners, though the shape is not limited to that depicted in FIGS. 1A-1B. In addition, the first and second magnetic shims 104*a*/104*b* may define recesses designed to receive ends of an electrical assembly 108 and/or magnets (e.g., magnets 106*a*-106*d*). The portion of the magnetic shims 104*a*/104*b* positioned on either side of the electrical assembly 108 (e.g., to the left and right of the electrical assembly 108) may be referenced as wing regions. That is, a first wing region may refer to a region where the first magnet 106*a* is positioned and a second wing region may refer to a region where the second magnet 106*b* is positioned. A portion between the first wing region and the second wing region may be referenced as a recessed area and may define a thinned portion configured to accommodate ends of the electrical assembly 108 (e.g., metal mounting tabs that are used to fasten the electrical assembly 108 to an electrical box).

The electrical assembly 108 may be positioned on top of the first magnetic shim 104*a* and the second magnetic shim 104*b* such that respective ends of the electrical assembly 108 (e.g., the metal mounting tabs) fit into respective recesses of the first magnetic shim 104*a* and the second magnetic shim 104*b*. The electrical assembly 108 may define a hole 110 and a switch 112 (e.g., a light switch) may extend through the hole 110. The electrical assembly 108 may be any form of electrical assembly and may be a paddle assembly, a switch assembly, an outlet assembly, and so on. The electrical assembly 108 may be affixed to the electrical box 102 by one or more fasteners, such as screws. To accept the fasteners, the electrical assembly 108 and/or the electrical box 102 may have fastener holes. For example, the electrical assembly 108 may include a clearance hole (or slot or other feature), and the electrical box 102 may have a hole to which the fastener attaches (e.g., a threaded or tappable hole). In some embodiments, the first and second magnetic shims 104*a*/104*b* are positioned between the electrical assembly 108 and the electrical box 102 and are clamped between the electrical assembly 108 and the electrical box 102. For example, during an installation process, the first and second magnetic shims 104*a*/104*b* may be positioned on respective ends of the electrical box 102. The electrical assembly 108 may then be tightened (e.g., by screwing the electrical assembly 108 to the electrical box 102), such that the ends of the electrical assembly 108 clamp the first and second magnetic shims 104*a*/104*b* to the electrical box 102. In this way, the first and second magnetic shims 104*a*/104*b* may be securely fastened (e.g., to the electrical box 102) without the use of additional fasteners.

Each of the first and second magnetic shims 104*a*/104*b* may include one or more magnets. The one or more magnets may be configured to magnetically attach to corresponding magnets on a magnetic cover plate (e.g., magnetic cover plate 114). In some cases, the one or more magnets magnetically attach to ferromagnetic material (e.g., a ferromagnetic metal such as steel) from which a cover plate may be fully or partially formed.

In some embodiments, four magnets (e.g., a first magnet 106*a*, a second magnet 106*b*, a third magnet 106*c*, and a fourth magnet 106*d*) are provided, with two magnets being provided on each respective magnetic shim. The magnets 106*a*-106*d* may be positioned within respective recesses formed in the first magnetic shim 104*a* and the second magnetic shim 104*b*. The magnets 106*a*-106*d* may have a thickness such that a surface of each of the magnets 106*a*-106*d* extends above (e.g., proud of) a surface of the surrounding magnetic shim. As discussed with respect to FIG.

4, below, this positioning of the magnets 106a-106d may result in a more secure connection between the magnetic shims 104a/104b and the magnetic cover plate 114.

As depicted in FIG. 1A, each individual magnet of the magnets 106a-106d may be positioned on a different end of each respective magnetic shim. As such, a first magnet 106a may be positioned on a first end of the first magnetic shim 104a and a second magnet 106b may be positioned on a second end of the second magnetic shim 104b. A first end of the electrical assembly 108 may be positioned between the first magnet 106a and the second magnet 106b. Likewise, the third magnet 106c and the fourth magnet 106d may be positioned on opposite ends of the second magnetic shim 104b, with a second end of the electrical assembly 108 positioned between the third magnet 106c and the fourth magnet 106d. In some embodiments, more, or fewer, magnets are provided instead of the four depicted magnets. In some examples, the first magnet 106a and the second magnet 106b are instead a single magnet that extends across a length of the first magnetic shim 104a. Any arrangement of magnets, with respect to the magnetic shims, may be provided in accordance with the provided disclosure.

FIG. 1B illustrates an exemplary embodiment of a magnetic cover plate 114 being installed with the first and second magnetic shims 104a/104b. A magnetic cover plate 114 may include a single hole 116 through which the switch 112 (or receptacle or other component of the electrical assembly) is received. Notably, the magnetic cover plate 114 may be free of any other hole other than the hole 116. As such, in some cases the magnetic cover plate 114 has no holes for any fasteners, such that the front surface is unmarred by openings (other than the hole 116 for the switch 112). The front surface of the magnetic cover plate 114 may be substantially planar. In some cases, edges of the magnetic cover plate 114 may be rounded to avoid potential sharp corners.

The magnetic cover plate 114 may additionally include a set of magnets on the cover plate (e.g., a first magnet 118a, a second magnet 118b, a third magnet 118c, and a fourth magnet 118d). The magnets 118a-118d may be positioned on the magnetic cover plate 114 such that distances between the magnets 118a-118d are substantially the same as the distances between the magnets 106a-106d. That is, a distance between magnet 118a and magnet 118b on the magnetic cover plate 114 may be substantially equivalent to a distance between magnet 106a and magnet 106b on the first magnetic shim 104a. The magnets 118a-118d may have a polarity that is opposite to a polarity of the magnets 106a-106d, such that the magnets magnetically attract to one another to retain the magnetic cover plate 114 in place.

Though the magnets 118a-118d are described as having an opposite polarity from the magnets 106a-106d, it is noted that other magnetic arrangements may be used. For example, in some cases, one or more of the magnets 106a-106d/118a-118d are replaced by a material that is capable of magnetically attracting to a magnet, such as a ferromagnetic material (e.g., steel). As one example, the magnetic cover plate 114 may be fully formed from a ferromagnetic material (e.g., a ferromagnetic steel). As another example, the magnetic cover plate 114 may include one or more ferromagnetic structures with an outer shell. The outer shell may be a partial outer shell or a full outer shell. A full outer shell may completely encapsulate or cover the ferromagnetic structure(s), such as a polymer overmold, a wrap (e.g., an adhesive film) that completely covers the ferromagnetic structure(s), or the like. A magnetic cover plate 114 with a partial outer shell may include one or more ferromagnetic structures configured to magnetically attach the cover plate to magnetic shims, as described herein, and a polymer, metal, or other material covering which defines at least a portion of the exterior of the magnetic cover plate 114. In some cases, the covering may be a film (e.g., an adhesive film), a rigid polymer structure (e.g., a molded plastic component), a coating (e.g., paint, ink, dye, etc.), or the like. Magnetic cover plates may be constructed in other ways as well.

Figure 3:
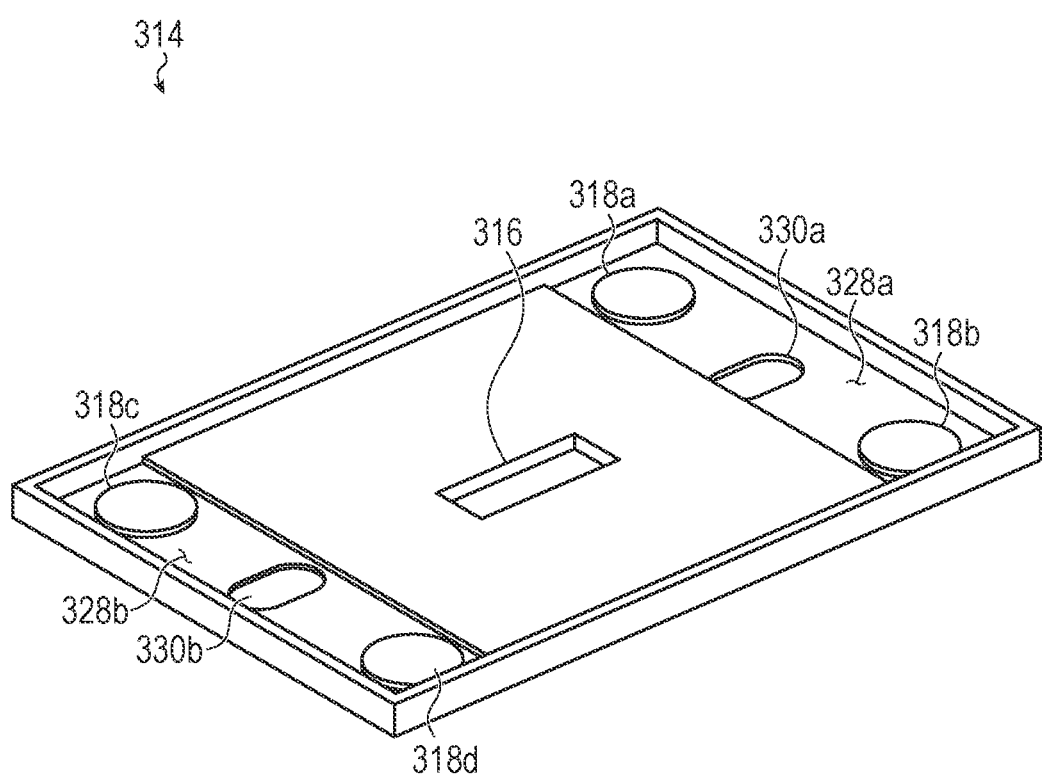
FIG. 3 illustrates an underside view of an example magnetic cover plate assembly, such as described herein.

The magnetic cover plate 114 may additionally include a raised rim or wall surrounding a recessed rear surface of the magnetic cover plate 114, as can be seen in FIG. 3 (e.g., a first cavity 328a and a second cavity 328b of the magnetic cover plate 314. Further features of the rear side of the cover plate are discussed with respect to FIG. 3.

FIG. 1C illustrates the magnetic cover plate 114 coupled with the magnetic shims 104a/104b. Though the electrical box 102 is visible in FIG. 1C, in cases where the electrical box 102 is positioned within a wall or structure, the only visible portion of the installed structure may be the switch 112 and the magnetic cover plate 114 (as the electrical box 102 is hidden by a wall or structure). As depicted in FIG. 1C, the magnets 118a-118d positioned on the cover plate 114 may attract, and be coupled to, the magnets 106a-106d. The magnets in FIG. 1C are depicted in phantom, as the magnets may be hidden by the magnetic cover plate 114.

Though a switch 112 is depicted in FIG. 1C, it is noted that any electrical assembly, or portion thereof, may be used in accordance with the present disclosure. For example, a paddle, electrical receptacle, rotary dimmer switch, slider, and so on, may be used with the magnetic cover plate 114, with an appropriately sized/shaped opening formed in the magnetic cover plate 114. In some cases, the magnetic cover plate 114 may be entirely uninterrupted by any opening such that the front surface is entirely continuous (e.g., for a blank wall plate that covers an electrical box that lacks a hole for a switch or outlet).

Figure 2A:
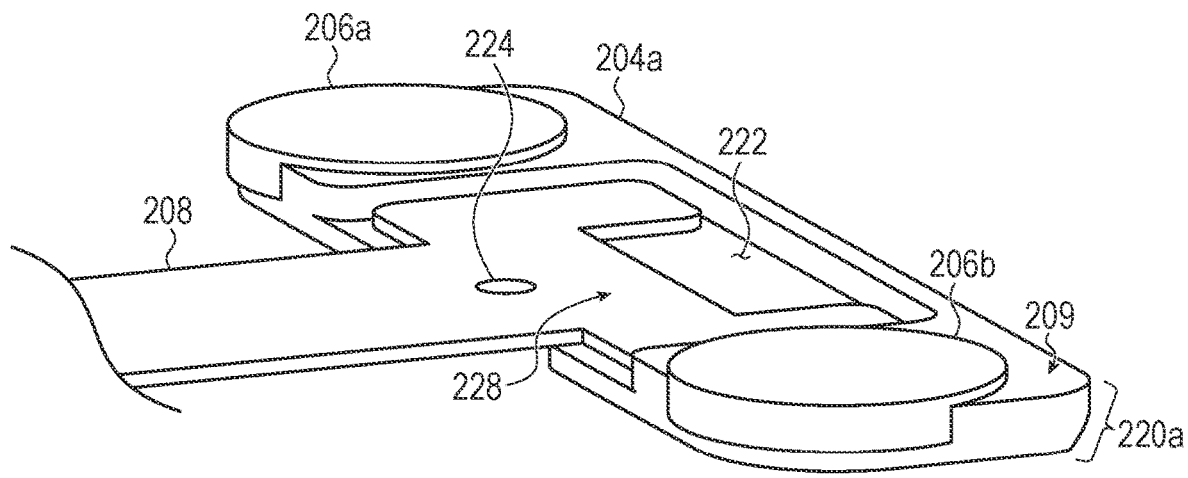
FIGS. 2A-2F illustrate example magnetic shims positioned between a switch assembly and an electrical box, such as described herein.
Figure 2B:
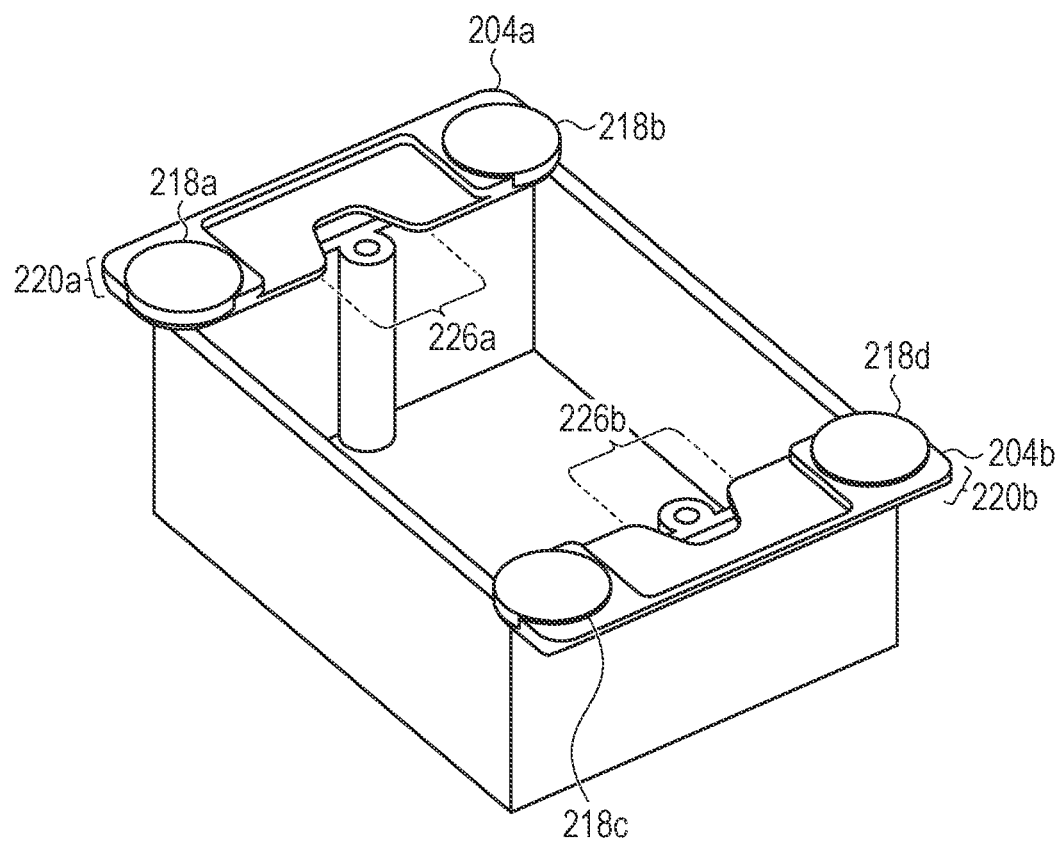

FIGS. 2A-2B illustrate additional details related to a first magnetic shim 204a and a second magnetic shim 204b. FIG. 2A illustrates a detailed view of a first magnetic shim 204a. As illustrated in FIG. 2A, the first magnetic shim 204a may comprise a recessed area 222. The recessed area 222 may be sized for a standard electrical assembly 208 (e.g., a standard light switch, electrical receptacle or outlet, and so on) and may be recessed such that a surface of the electrical assembly 208 is substantially on the same plane as a front surface 209 of the first magnetic shim 204a, though the surface of the electrical assembly may alternatively be below (e.g., recessed relative to) the front surface 209 of the first magnetic shim 204a (as depicted in FIG. 2A) or above (e.g., proud of) the front surface 209 of the first magnetic shim 204a.

The first magnetic shim 204a may additionally include recessed areas configured to receive magnets, such as a first magnet 206a and a second magnet 206b. The first and second magnets 206a/206b may sit within the recessed areas. A respective surface of the first and second magnets 206a/206b may extend above the surrounding surface of the first magnetic shim 204a. Through this arrangement, magnets and/or ferromagnetic material on a magnetic shim and respective magnets and/or ferromagnetic material on a magnetic cover plate may come into contact with, or otherwise be in close proximity with, one another at a suitable magnetic strength (e.g., to resist accidental detachment between the magnetic shim(s) and the magnetic cover plate). More particularly, by positioning the first and second magnets 206a/206b proud of the front surface of the first magnetic shim 204a, the surfaces of the magnets (or ferromagnetic materials) on the shim and the cover plate may contact each other, or otherwise be positioned closer to one another than would be possible if the first and second magnets 206a/206b were flush or recessed with respect to the shim surface.

The electrical assembly 208 may comprise a fastener hole 224 such that a screw may pass through the electrical assembly 208. With reference to FIG. 2B, the fastener may pass through the fastener hole 224 and into a corresponding hole located on an electrical box (e.g., accessible via notches 226a/226b). The electrical assembly 208 may comprise a mounting tab 228 configured to secure the shims 204a to the electrical assembly. To permit the passage of the fastener through the fastener hole 224, the first magnetic shim 204a may include a notch 226a (e.g., a v-shaped or u-shaped notch). Through this arrangement, the electrical assembly 208 may be directly coupled (e.g., via a fastener) through the notch 226a of the first magnetic shim 204a without coming into direct contact with the first magnetic shim 204a.

The first magnetic shim 204a may additionally comprise a cleat 220a, with reference to FIG. 2A, a first magnet 218a, and a second magnet 218b, as referenced in FIG. 2B. The cleat may be a rounded, an angled, and/or a chamfered edge and may be configured to resist removal of an installed magnetic cover plate. The cleat 220a may, for example, interact with a rim, flange, wall, or other feature of the magnetic cover plate to prevent the magnetic cover plate from being removed in an entirely perpendicular fashion with respect to the first magnetic shim 204a. In some cases, the cleat 220a may be or may resemble a French cleat.

A corresponding second magnetic shim 204b may be positioned on an opposite end, with respect to an electrical box, from the first magnetic shim 204a. The second magnetic shim 204b may be substantially identical to the first magnetic shim 204a and may include a second notch 226b, a second recessed area for an electrical assembly 208, a third magnet 218c, and a fourth magnet 218d. In some implementations, the second magnetic shim 204b comprises features not present in the first magnetic shim 204a, such as a spring cleat (see, e.g., FIG. 7A). Any manner of cleat, or lack thereof, may be provided on any of the first magnetic shim 204a or the second magnetic shim 204b. For example, in some cases neither the first nor second magnetic shims include cleats.

In the embodiment depicted in FIGS. 2A-2B, the first magnetic shim 204a is not connected with the second magnetic shim 204b. However, in other embodiments, the first and second magnetic shims 204a/204b are connected in any manner, such as along edge portions. In some cases, the fastener holes of the electrical box are exposed even when the first and second magnetic shims 204a/204b are connected.

As depicted in FIG. 2B, the first magnetic shim 204a may comprise a first cleat 220a and the second magnetic shim 204b may comprise a second cleat 220b. As described above with respect to the cleat 220a, the first and second cleats 220a/220b may be an angled, a rounded, and/or a chamfered edge with which a magnetic cover plate may contact to facilitate an installation process. The cleats, such as the first cleat 220a, may work with gravitational forces such that a magnetic cover plate slides along the first cleat 220a and/or second cleat 220b during an installation process. In some implementations, one or both of the first and second cleats 220a/220b may be omitted such that only one or none of the magnetic shims 204a/204b include a cleat. In some implementations, only the first magnetic shim 204a has a cleat 220a to utilize gravitational forces in installing an associated magnetic cover plate.

Figure 2C:
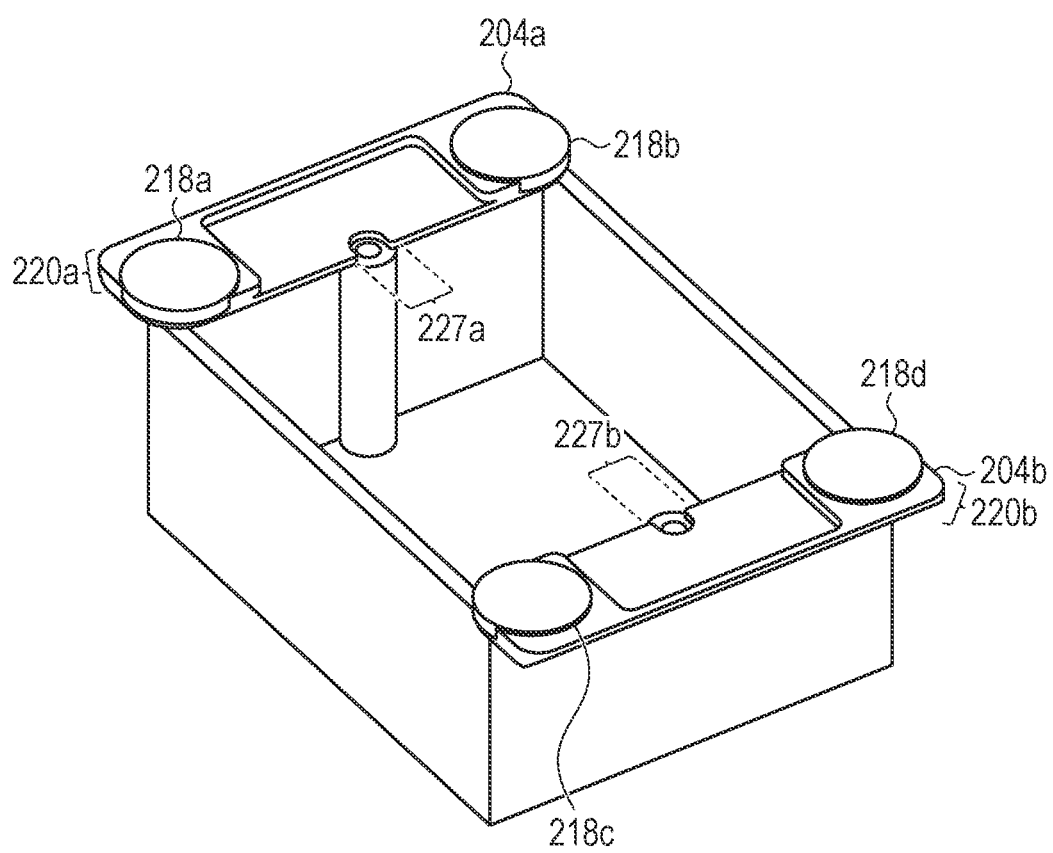
Figure 2D:
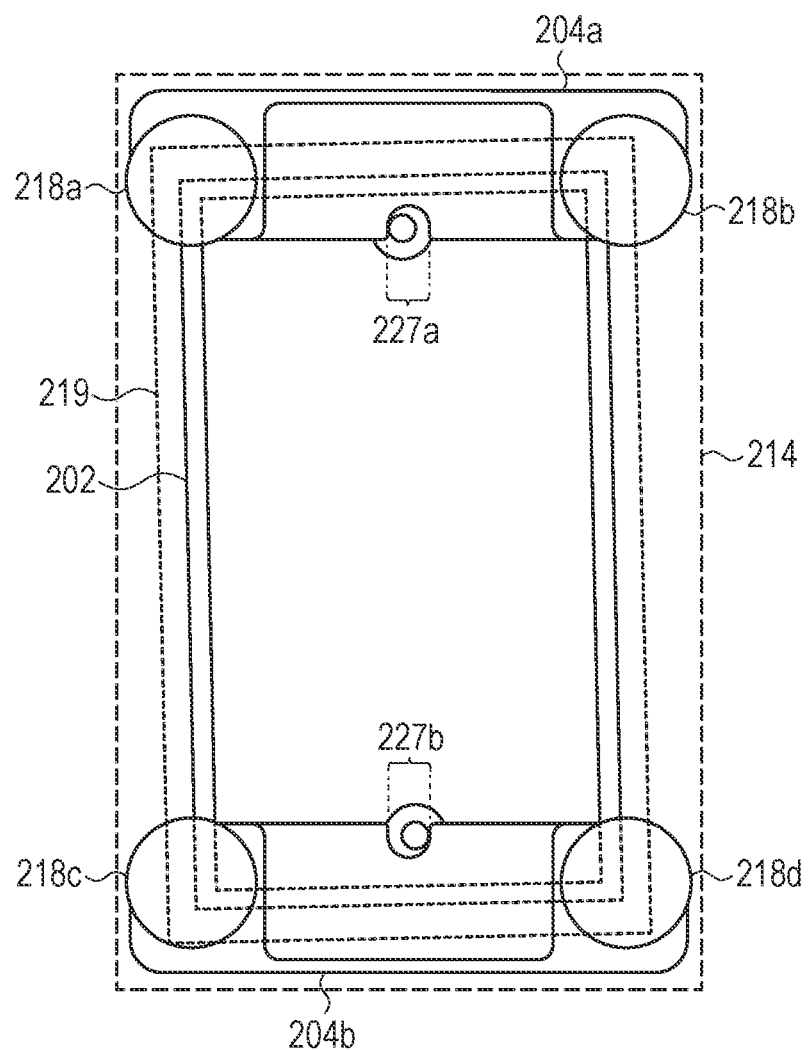

FIGS. 2C-2D illustrate an example of the first and second magnetic shims 204a/204b having first and second notches 227a/227b with a smaller size when compared to the first and second notches 226a/226b described with respect to FIGS. 2A-2B. In particular, a size of the first and second notches 227a/227b may be a size between about 1%-10% larger than about 3/16 of an inch through about 1/2 of an inch (e.g., as example diameters of a screw). As depicted in FIG. 2D, the first and second magnetic shims 204a/204b may pivot around notches 227a/227b due to the presence of a screw extending through an associated hole of the electrical box.

As the magnetic shims 204a/204b may pivot about the notches 227a/227b, an installation of the notches 227a/227b may have a high degree of flexibility. In other words, a position of one or more of the first and second magnetic shims 204a/204b may be refined by rotating either one of the first and second magnetic shims 204a/204b about the pivot point (e.g., notches 227a/227b). As the position/rotational angle of the first and second magnetic shims 204a/204b may be modified, a placement of a magnetic cover plate installed over the first and second magnetic shims 204a/204b may be customizable so as to finely control an appearance and/or cover plate angle with respect to a mounting surface.

As depicted in FIG. 2D, an electrical box 202 may occasionally be improperly installed or may otherwise be crooked or misaligned with respect to a mounting structure (e.g., the electrical box 202 is not plumb or level in a wall). Such misalignment may occur due to the geometry of a mounting surface or structure, poor craftsmanship, and/or drift due to the passage of time and degradation of the mounting structure. As the first and second magnetic shims 204a/204b are moveable and rotatable around their respective pivot points (e.g., notches 227a/227b), a user may manipulate the magnetic cover plate 214 and/or the first and second magnetic shims 204a/204b to align the magnetic cover plate 214 with external reference structures (e.g., a trim, door, molding, and so on). In this way, a user may have a high degree of flexibility when installing/modifying a position of a magnetic cover plate 214 that is not exclusively dependent on an installation quality of the electrical box 202.

As depicted in FIG. 2D, an opening 219 may be formed in the mounting structure. The opening 219 may otherwise be referenced as a hole. The opening 219 may be a hole cut or otherwise formed through or in the mounting structure (e.g., a hole in a wall) to allow an electrical box and switch to be positioned in the wall. As depicted, the first and second magnetic shims 204a/204b are larger than the opening 219 and portions of the first and second magnetic shims 204a/204b extend past the opening 219 and rest on a portion of the mounting structure (e.g., on a surface of the wall). As the first and second magnetic shims 204a/204b rest on the mounting structure, the shims 204a/204b are held flush against the mounting structure and thus cause the cover plate 214 to be held flush against the mounting structure despite potential misalignments of the electrical box 202, as described with respect to FIGS. 2E-2F and 9C. Though the shims 204a/204b are discussed as magnetic shims, and the cover plate 214 is discussed as a magnetic cover plate, it is understood that, in some implementations, the shims 204a/204b and/or the cover plate 214 may not comprise magnets or magnetic material. For example, the shims and cover plate may use cleat-like structures to engage one another to retain the cover plate in the target location and position (as described with respect to FIGS. 8A-10B, for example). In some examples, both cleats and magnets may be used to align and retain the cover plate with the shims.

Figure 2E:
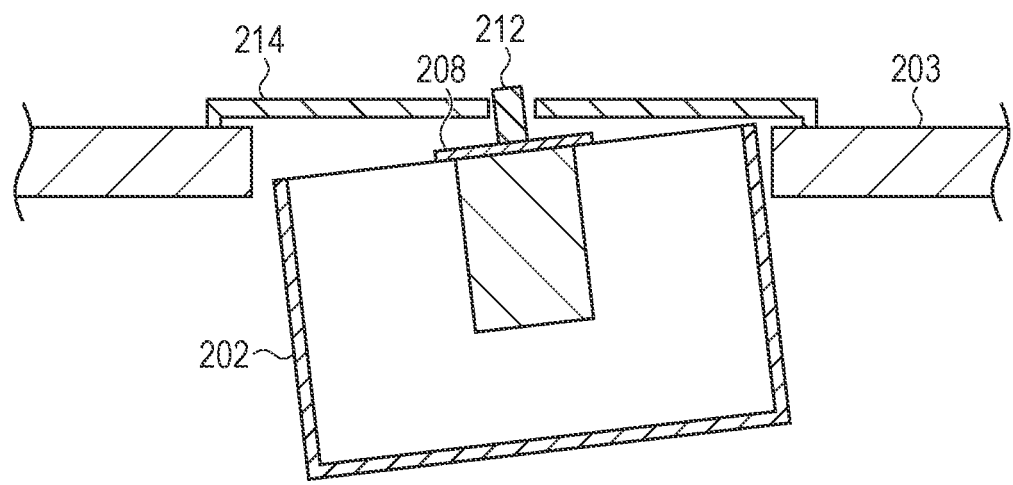
Figure 2F:
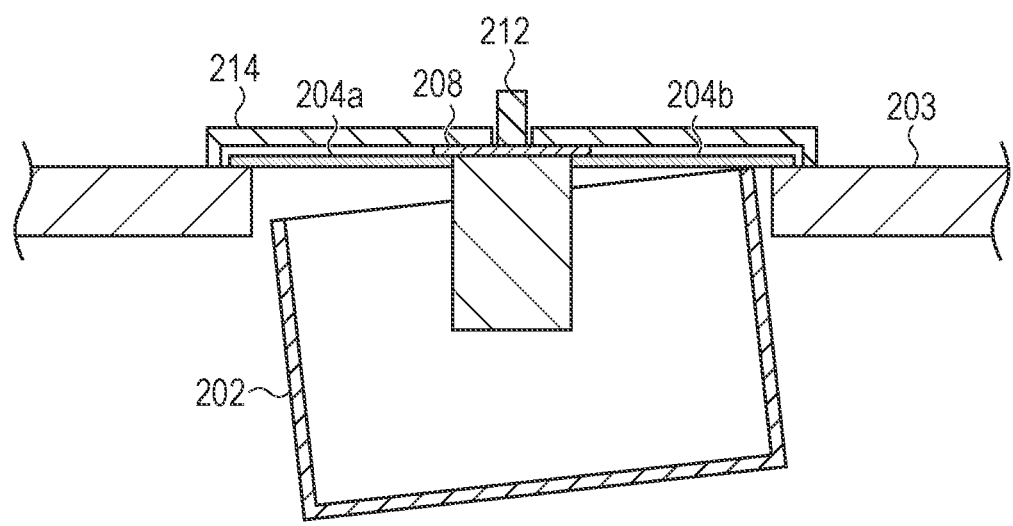

FIGS. 2E-2F depict an example electrical box 202 misaligned with respect to a wall surface 203 (which is an example mounting structure) or other structure in which an electrical box may be installed. As depicted in FIGS. 2E-2F, an electrical box 202 may not be flush with the wall, due to poor installation or other potential deficiencies. As a result, and as depicted in FIG. 2E, a switch 212 may be crooked or otherwise uncentered with respect to the wall surface 203.

As described above, a first magnetic shim 204a and a second magnetic shim 204b may be positioned underneath an electrical assembly 208. The first magnetic shim 204a and the second magnetic shim 204b may be additionally positioned on top of the wall surface 203, as depicted in FIG. 2F. Through this arrangement, the electrical assembly 208 and the switch 212 may be made to be aligned with the wall surface 203, thereby reducing or eliminating the effects of misalignment due to a position of the electrical box 202. As the magnetic shims 204a/204b are aligned via the wall surface 203 (e.g., they are held flush against the wall surface), and not the electrical box 202, the switch 212 alignment relative to the wall surface 203 may be improved. More particularly, because the cover plate 214 is aligned to the shims 204a/204b, rather than the electrical box 202, and the shims 204a/204b are held against the wall surface 203, the cover plate 214 is ultimately held against the wall surface 203 and not the electrical box 202. Accordingly, misalignments of the electrical box 202 may not be transferred to or reflected in the alignment of the cover plate 214. Though shims 204a/204b are described as being magnetic shims, non-magnetic shims may be used in alternative embodiments.

FIG. 3 illustrates an example rear view of a magnetic cover plate 314. The magnetic cover plate may be substantially similar to the magnetic cover plate 114 as depicted in FIGS. 1B-1C.

The magnetic cover plate 314 may comprise an opening 316 for a switch of an electrical assembly. Though the opening 316 depicted in FIG. 3 is to receive a switch, any sized opening may be used as the opening 316, including openings suitable for paddle switches, outlets, and so on. In additional or alternative embodiments, the opening 316 is one of multiple openings defined in the magnetic cover plate 314 (e.g., in the case of an electrical outlet with two receptacles).

The magnetic cover plate 314 may additionally include a first cavity 328a and a second cavity 328b. As depicted in FIG. 3, the first cavity 328a and the second cavity 328b may be positioned on opposite ends of the magnetic cover plate 314. The respective cavities 328a/328b may be separated by a raised portion (e.g., the raised portion surrounding the opening 316). A number of magnets (or ferromagnetic materials) may be placed within the first cavity 328a and the second cavity 328b. For example, a first magnet 318a and a second magnet 318b may be positioned within the first cavity 328a and a third magnet 318c and a fourth magnet 318d may be positioned within the second cavity 328b. While FIG. 3 depicts two magnets in each respective cavity 328a/328b, any number of magnets may be positioned within each respective cavity 328a/328b. For example, a single bar magnet, extending across a length of the cavities 328a/328b, may be placed in each cavity 328a/328b. Alternatively, ferromagnetic material may be used in place of one or more of the magnets 318a-318d. Each magnet, or ferromagnetic material, may be affixed to the magnetic cover plate 314 through any adhesive or bonding mechanism. In some cases, a glue, epoxy, or cement may be placed on an underside of each magnet or ferromagnetic material so as to connect each magnet with the magnetic cover plate 314, though any attachment mechanism may be used.

Additional screw cavities (e.g., a first screw cavity 330a and a second screw cavity 330b) may be positioned within a respective cavity 328a/328b. The screw cavities 330a/330b may be positioned such that a screw or other fastener that is used to fasten the electrical assembly to the electrical box does not extend through to a surface of the magnetic cover plate 314. For example, a portion of a fastener coupling an electrical assembly to an electrical box may fit within the screw cavities 330a/330b. More particularly, a first screw head of a first screw may be positioned within the first screw cavity 330a and a second screw head of a second screw may be positioned within the second screw cavity 330b. The first cavity 328a, the second cavity 328b, the first screw cavity 330a, and the second screw cavity 330b may be formed within the rear surface of the magnetic cover plate 314 such that none of the cavities extend through or are otherwise visible on the front of the magnetic cover plate 314 (e.g., the cavities may be blind holes). That is, the cavities may not extend to a front surface of the magnetic cover plate 314 (e.g., the cavities do not form holes extending through a thickness of the magnetic cover plate 314). In some cases, the screw cavities 330a/330b may be omitted. Additionally or alternatively, the cavities 328a/328b may be omitted such that the rear surface has a flat, consistent surface.

As additionally illustrated in FIG. 3, a raised rim or wall may surround the rear surface of the magnetic cover plate 314. The raised rim or wall may be formed such that the raised rim or wall comes into contact with a wall or structure within which an electrical box is installed. This may increase a stability of the magnetic cover plate 314, when the magnetic cover plate 314 is installed, such that the magnetic cover plate 314 resists unintended movement (e.g., movement when a user is not attempting to remove the magnetic cover plate 314 from one or more magnetic shims).

Figure 4:
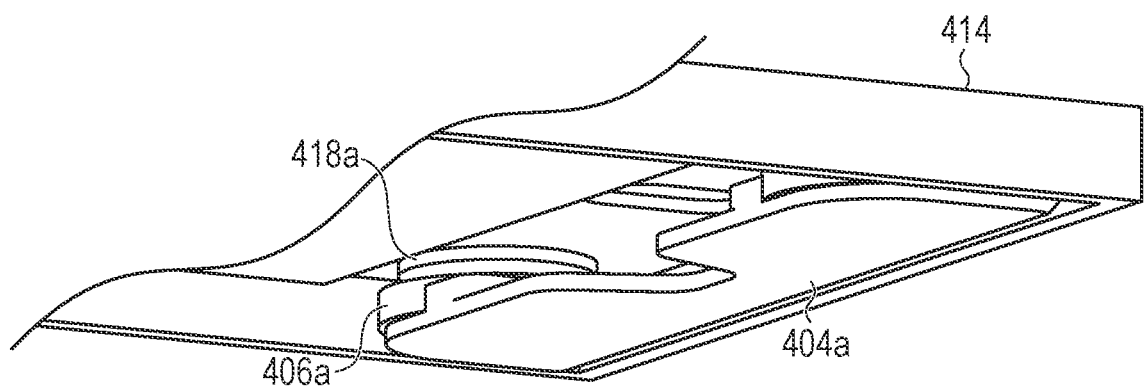
FIG. 4 illustrates an underside view of an example magnetic cover plate assembly positioned on a magnetic shim, such as described herein.

FIG. 4 illustrates an example magnetic cover plate 414 when the magnetic cover plate 414 is installed with a first magnetic shim 404a. Though a second magnetic shim is not depicted, it is appreciated that a second magnetic shim may be provided on an opposite end portion of the magnetic cover plate 414.

When installed with a first magnetic shim 404a, the magnetic cover plate 414 may come into contact with the first magnetic shim 404a. As illustrated in FIG. 4, a first magnet 406a of the first magnetic shim 404a may come into contact with, or may otherwise be in close proximity with, a corresponding first magnet 418a of the magnetic cover plate 414. The respective magnets may be positioned such that the opposite polarities of each respective magnet face each other such that the opposing magnets attract and are not repelled.

As noted with respect to the cleat depicted in FIG. 2A (cleat 220a) the first magnetic shim 404a may slide into the magnetic cover plate 414. That is, the cleat may slide beneath a corresponding cleat-like feature (e.g., an angled lip or flange) of the raised rim or wall of the magnetic cover plate 414 as the magnetic cover plate 414 is positioned over the first magnetic shim 404a. Through this arrangement, the cleat may prevent, or resist, the magnetic cover plate 414 from being removed from the magnetic shims without a particular, deliberate decoupling motion, thereby resisting accidental removal.

In some embodiments, a gap is provided between the magnets on the first magnetic shim 404a (or multiple magnetic shims) and magnets on the magnetic cover plate 414. This may be referred to as an installation tolerance gap. This installation tolerance gap may allow for tolerance issues that may arise due to a geometry of a wall/structure while still maintaining flush contact between the wall/structure and the magnetic cover plate 414.

Figure 5A:
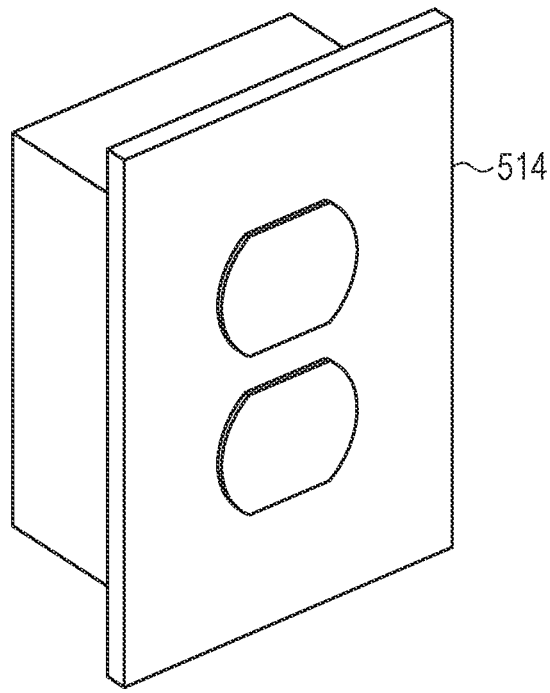
FIGS. 5A-5B illustrate an example magnetic cover plate mounting assembly for an outlet assembly, such as described herein.
Figure 5B:
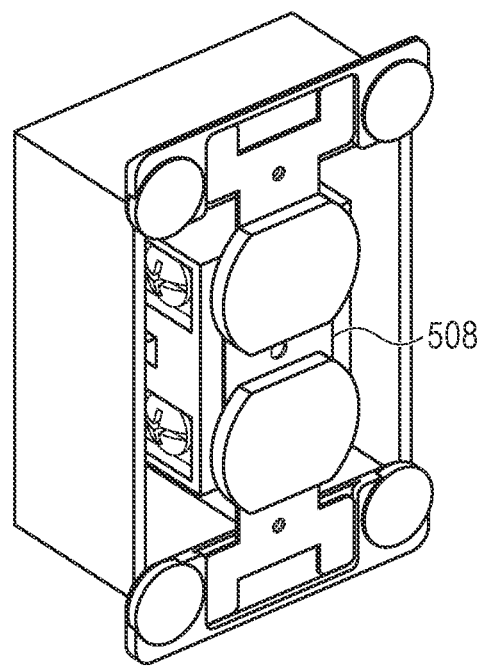

FIGS. 5A-5B illustrate a magnetic cover plate mounting assembly for an outlet 508 as an electrical assembly. Features not described with respect to FIGS. 5A-5B may be similar to those discussed with respect to FIGS. 1B-4.

As shown in FIG. 5A, a magnetic cover plate 514 may be provided over one or more magnetic shims. The magnetic shims may be positioned or clamped, as described above, between an electrical box and an outlet 508 (FIG. 5B). In some embodiments, dimensions of the magnetic shims are varied in accordance with different dimensions associated with the outlet 508. That is, the magnetic shims may have a shape/size different than a shape/size of the magnetic shims depicted in FIGS. 1A-5B. In other embodiments, the magnetic shims may be substantially identical to the magnetic shims discussed above.

As illustrated in FIG. 5A, the magnetic cover plate 514 may comprise two holes, or one hole each for each electrical receptacle or outlet. Alternatively, one hole may surround both electrical outlets without a portion of the magnetic cover plate 514 separating multiple holes.

Figure 6A:
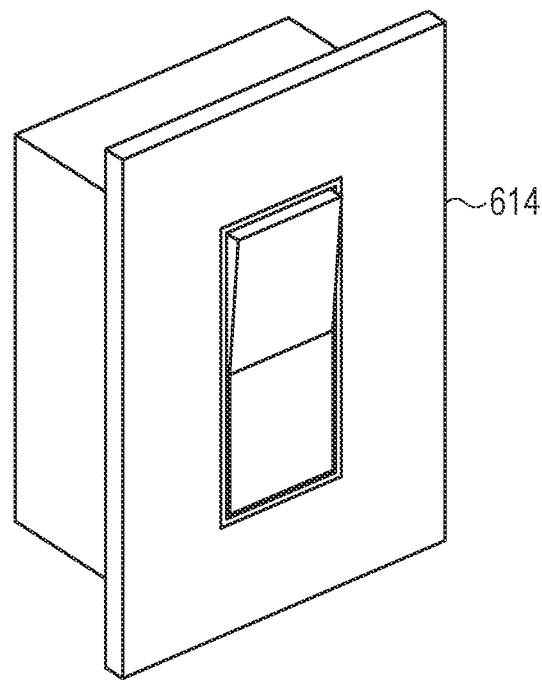
FIGS. 6A-6B illustrate an example magnetic cover plate mounting assembly for a paddle switch assembly, such as described herein.
Figure 6B:
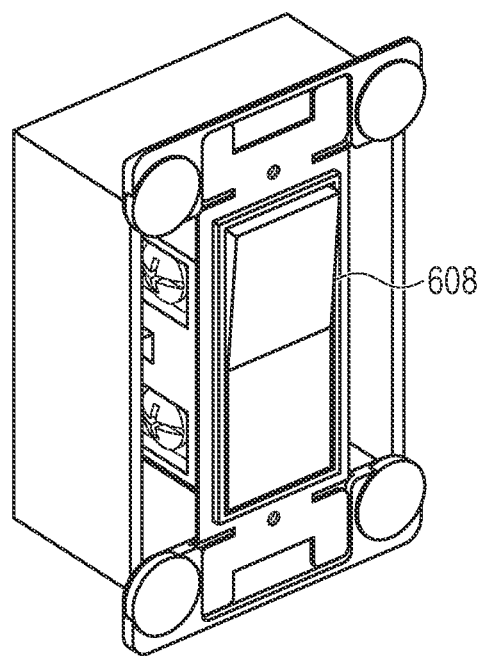

FIGS. 6A-6B illustrate a magnetic cover plate mounting assembly for an electrical assembly with a paddle switch 608, otherwise referenced as a paddle. Features not described with respect to FIGS. 6A-6B may be similar to those discussed with respect to FIGS. 1B-4.

As shown in FIG. 6A, a magnetic cover plate 614 may be provided over one or more magnetic shims positioned or clamped between an electrical box and a paddle switch 608. The paddle switch 608, shown in FIG. 6B, may be rocked back and forth to close or open an associated electrical switch in the electrical assembly. In some embodiments, dimensions of the magnetic shims associated with the paddle switch 608 may be varied in accordance with different dimensions associated with the paddle switch. In other embodiments, the magnetic shims are substantially identical to the magnetic shims discussed above.

In FIGS. 5A-6B, two embodiments are depicted. However, it is appreciated that any number of electrical assemblies may be positioned within an electrical box and any number of elements may pass through one or more holes of a magnetic cover plate. For example, the electrical assembly may be or may include a dimmer, knob, and so on. The magnetic cover plate and/or magnetic cover plate mounting assembly for different types of electrical assemblies may be identical (e.g., a dimmer may use the same elements as a paddle switch) or may be different due to different dimensions of the electrical assembly (e.g., an electrical outlet may have a different front-facing geometric configuration as compared to a paddle switch).

Figure 7A:
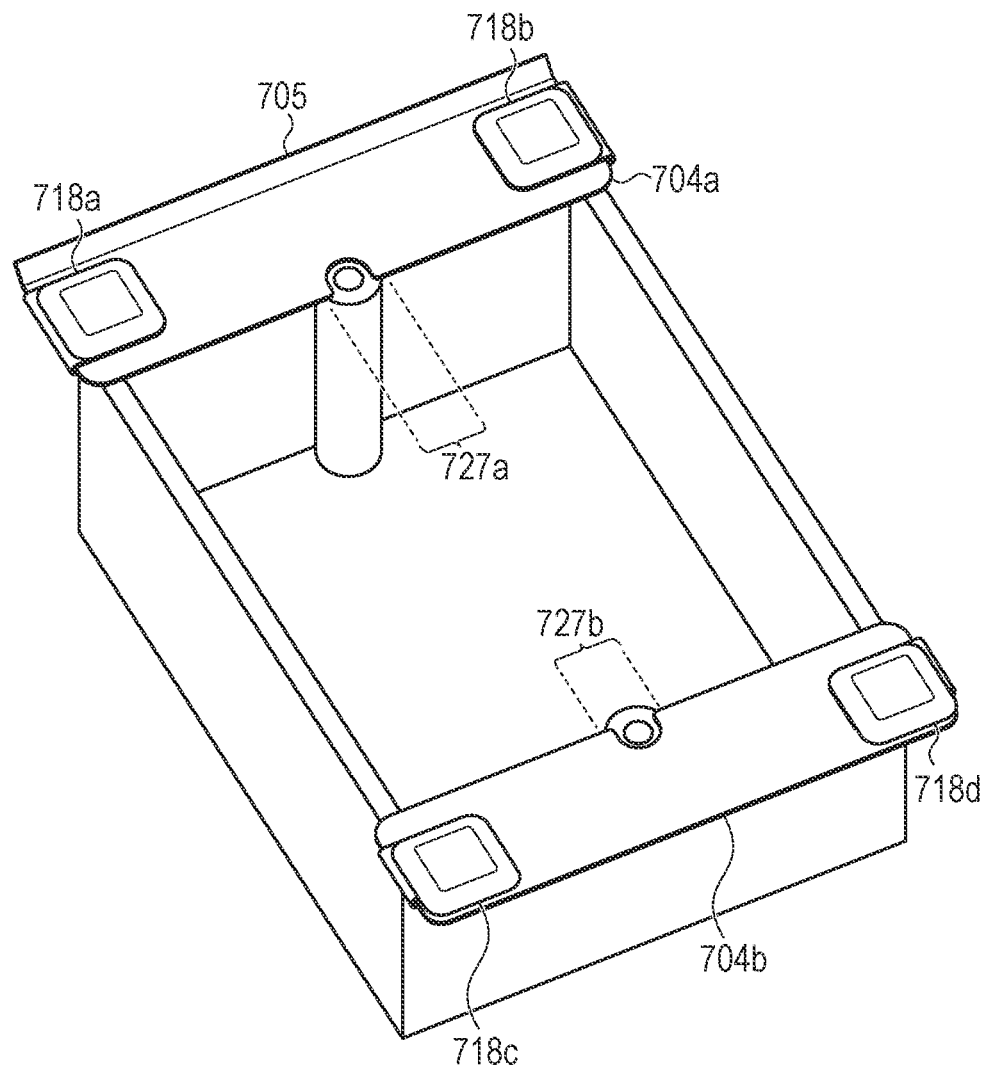
FIGS. 7A-7B illustrate example magnetic shims, such as described herein.
Figure 7B:
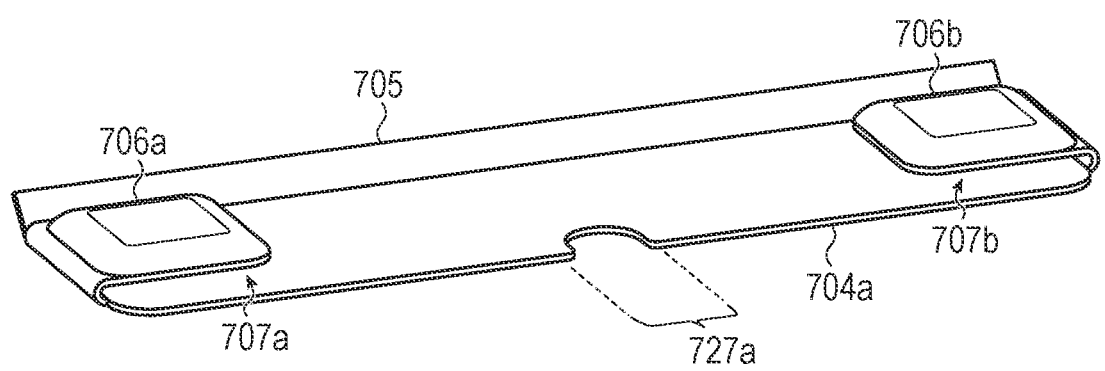

FIGS. 7A-7B illustrate another example of magnetic shims 704a/704b. The magnetic shims 704a/704b include one or more tabs (see, e.g., elements 707a/707b as depicted in FIG. 7B) that suspend one or more magnets 718a-718d above a surface of the magnetic shims 704a/704b. As the one or more magnets 718a-718d are elevated above a surface of the magnetic shims 704a/704b, the tabs 707a/707b may define an elevated structure, relative to the of the shims, and may position the one or more magnets 718a-718d at a target height above the base portion, such that the magnets can suitably attract, and be attracted to, an associated cover plate. More particularly, the tabs 707a/707b may allow the one or more magnets 718a-718d to be positioned further outward from the base structure so that they can be positioned closer to the cover plate than would be achieved by placing the magnets directly on the base structure (e.g., as depicted in FIGS. 1A-2D). Additionally, the elevated structure may facilitate the use of smaller magnets while achieving the same level of magnetic attraction as would be achieved by larger magnets positioned on the base structure As described with respect to FIGS. 2C-2D, the notches 727a/727b may be sized so as to both receive a screw (e.g., a screw into an electrical box) and to act as a pivot. That is, the first and second magnetic shims 704a/704b may pivot about the screws that attach the magnetic shims 704a/704b to the electrical box during installation and/or to adjust an angle of the magnetic shims 704a/704b with respect to the underlying electrical box. One or more magnetic shim (e.g., magnetic shim 704a) may further include an angled cleat 705. The angled cleat 705 may act as an internal support and may act to align a cover plate (e.g., a magnetic cover plate 114). Additionally, the angled cleat 705 may couple with a magnetic cover plate and may act to securely position the magnetic shim 704a with the magnetic cover plate. In some implementations, the angled cleat 705 may be omitted and the magnetic shim 704a may be the same as the magnetic shim 704b. In some implementations, an angled cleat may be provided additionally or alternatively on the second magnetic shim 704b. Any form of cleat may be provided in accordance with the instant disclosure, such as a spring cleat or a French cleat, as discussed herein.

FIG. 7B depicts an alternate view of a first magnetic shim 704a. As depicted in FIG. 7B, a first magnet 706a may be provided on a first tab 707a and a second magnet may be provided on a second tab 707b. The tabs 707a/707b may be formed in any manner, such as, for example, by bending a metal sheet to form the tabs (and the optional cleat 705). The tabs 707a/707b may be formed in a cantilevered state and may be moveable with respect to a body of the magnetic shim 704a. For example, the tabs 707a/707b may be bent when a magnetic cover plate is installed to encourage flush mounting of the cover plate to the wall. More particularly, during installation, the tabs may be plastically deformed either inwards (e.g., towards the wall) or outwards (e.g., away from the wall) to allow fine tuning of the fit between the cover plate and the wall. The tabs may be bent by direct manipulation of the tabs, or by applying an inward force to the cover plate as the cover plate is being magnetically attached to the shims. The first magnetic shim 704a and the second magnetic shim 704b may be formed in any appropriate manner and may, in some implementations, be stamped. The implementation depicted in FIGS. 7A-7B does not include a recessed region (e.g., the recessed area 222 depicted in FIG. 2A). However, in some implementations, one or more recessed regions may be provided. In some embodiments, the one or more magnets 706a-706d, or a subset thereof, may be omitted. In such cases, the tabs 707a/707b may be formed from a ferromagnetic material and may be attracted to corresponding magnets positioned on a magnetic cover plate, as described herein.

Figure 8A:
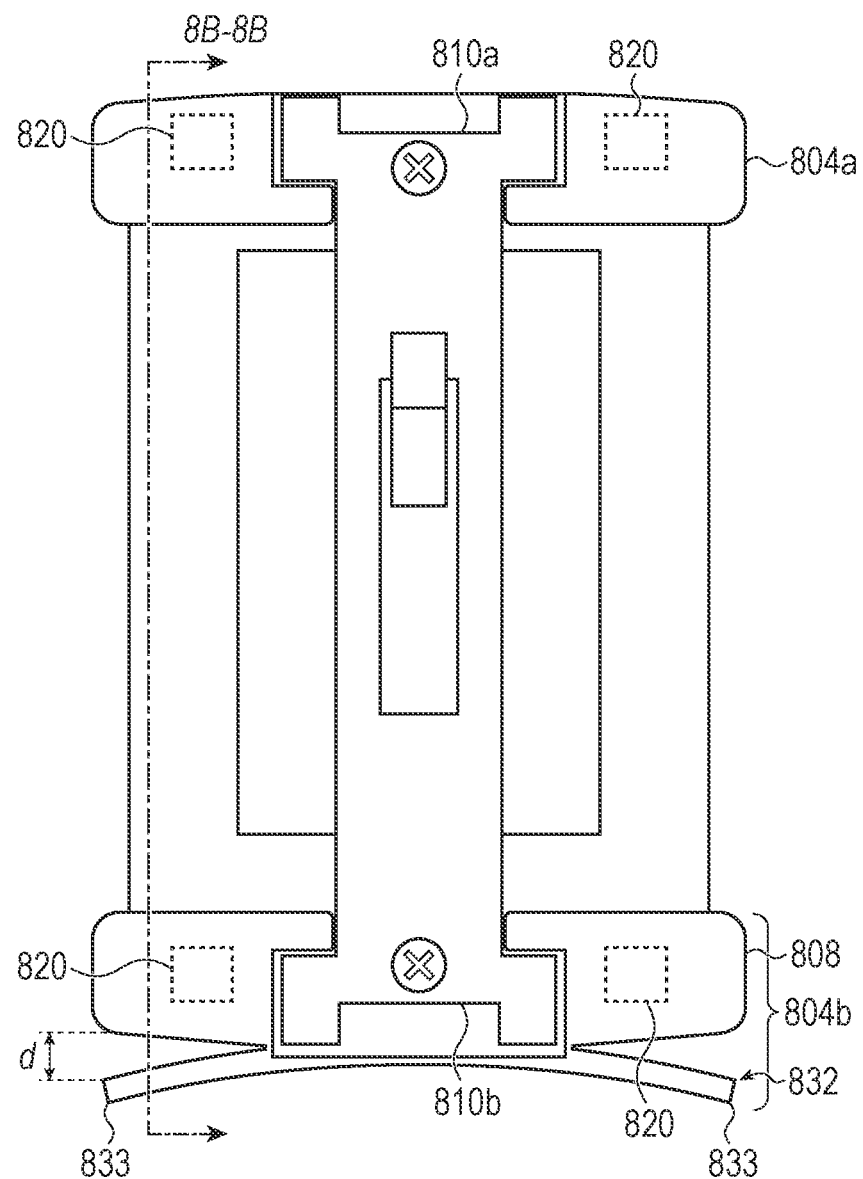
FIGS. 8A-8D illustrate example securing shims and an installation of a cover plate assembly with respect to a spring cleat, such as described herein.
Figure 8B:
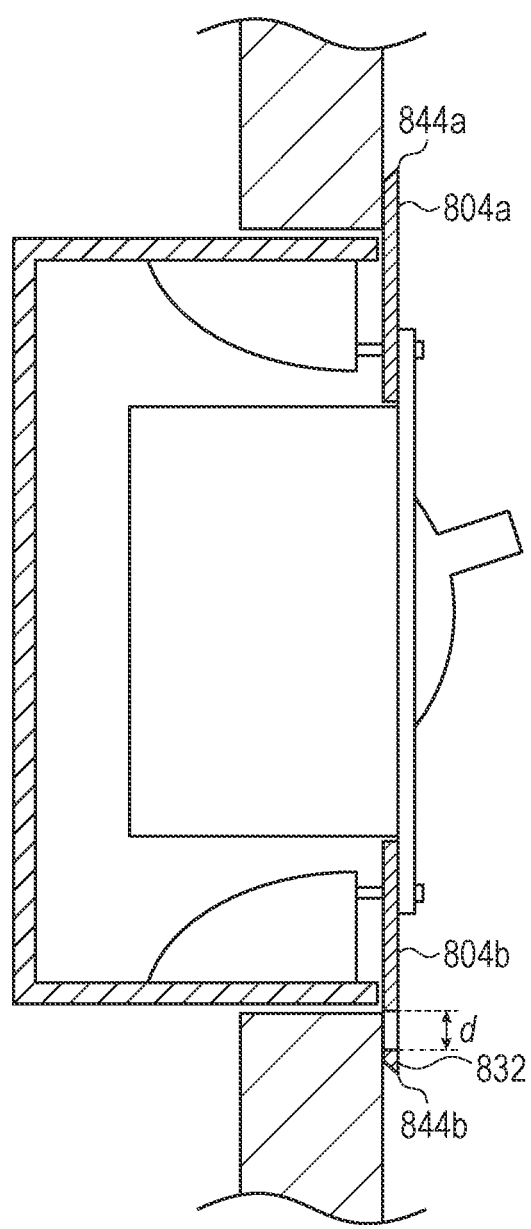

FIGS. 8A-8D illustrate an example of the cover plate mounting assembly and an installation thereof without magnets. In some cases, a first shim and a second shim used in a cover plate mounting assembly may be different from one another. As depicted in FIGS. 8A and 8B, a first shim 804a may be configured to be positioned between the electrical box and a first mounting tab 810a of the electrical assembly.

A second shim 804b may be configured to be positioned between the electrical box and a second mounting tab 810b of the electrical assembly. In some embodiments, the first shim 804a and/or the second shim 804b may include magnets 820.

The second shim 804b may comprise a base portion 808 and a spring cleat 832. The spring cleat 832 may be or may include one or more biasing members 833. As shown in FIGS. 8A and 8B, the biasing members 833 extend from the base portion of the second shim. The biasing members 833 may be flexible and may be moveable with respect to the base portion 808 of the second shim 804b. As shown in the instant example, the biasing members 833 are part of a unitary structure (e.g., a single piece of molded polymer, a single stamped metal component, a unitary metal structure, etc.), and as such may also be understood as different portions of a single biasing member. In other examples, biasing members may be more structurally distinct, such as where multiple separate springs (e.g., metal or polymer leaf springs) are fastened or otherwise attached to a base portion of a shim.

The biasing members 833 may have or define a curvature extending from one end of the spring cleat 832 to the opposite end of the spring cleat 832 (e.g., from left to right). The curvature may have a radius of 200 millimeters, or any other suitable dimension that allows for installation and retention of the cover plate as illustrated and described herein. The biasing members 833 (and thus the spring cleat 832) may have both a compressed (e.g., deflected) state and an uncompressed (e.g., undeflected) state. The uncompressed state may be a default state of the spring cleat 832 and may refer to the biasing members 833 in a relaxed state (e.g., not being subjected to external forces). The compressed state of the spring cleat 832 may occur when a force is applied to the biasing members 833, such as may occur during and after installation of a cover plate. When a cover plate is fully installed on the shims (e.g., in FIG. 8D), the spring cleat 832 may revert to an uncompressed state or may be in a partially- or fully-compressed state. In this state, the return or biasing force of the spring cleat 832 forces the engagement features of the shim cleats and the engagement features of the cover plate into engagement with each other and generally secures the cover plate to the shims, as described herein.

As shown in FIG. 8A, the biasing members 833 may be set apart from the base portion 808 of the shim by a distance "d." The distance "d" may define the maximum travel or deflection distance of the biasing members 833 when the cover plate 814 is installed on the shims, as described herein. The distance "d" may be selected in conjunction with the geometry of the engagement features of the cover plate 814 and the engagement feature 844a, 844b to allow the cover plate 814 to be installed on the engagement feature 844a, 844b (e.g., so the engagement feature 854a can clear the engagement feature 844a during installation) and also maintain a biasing force on the cover plate 814 after installation is completed (e.g., so that the biasing members 833 continue to contact and impart a biasing force on the cover plate 814 after installation).

FIG. 8B shows an example of a cross section of the electrical box, the electrical assembly, and the first and second shims 804a, 804b, viewed along line 8B-8B in FIG. 8A. The first shim 804a defines an engagement feature 844a. The engagement feature 844a may be configured to engage with a corresponding engagement feature of a cover plate 814 (e.g., the engagement feature 854a in FIG. 8D). The engagement feature 844a may be an angled surface, resembling a French cleat, or any other suitable shape or configuration for mating with a corresponding engagement feature of the cover plate 814. In some embodiments, the spring cleat 832 on the second shim 804b may define an engagement feature 844b. As described above, this engagement feature may be an angled surface, resembling a French cleat, or any other suitable shape or configuration for mating with a corresponding feature of the cover plate 814.

Figure 8C:
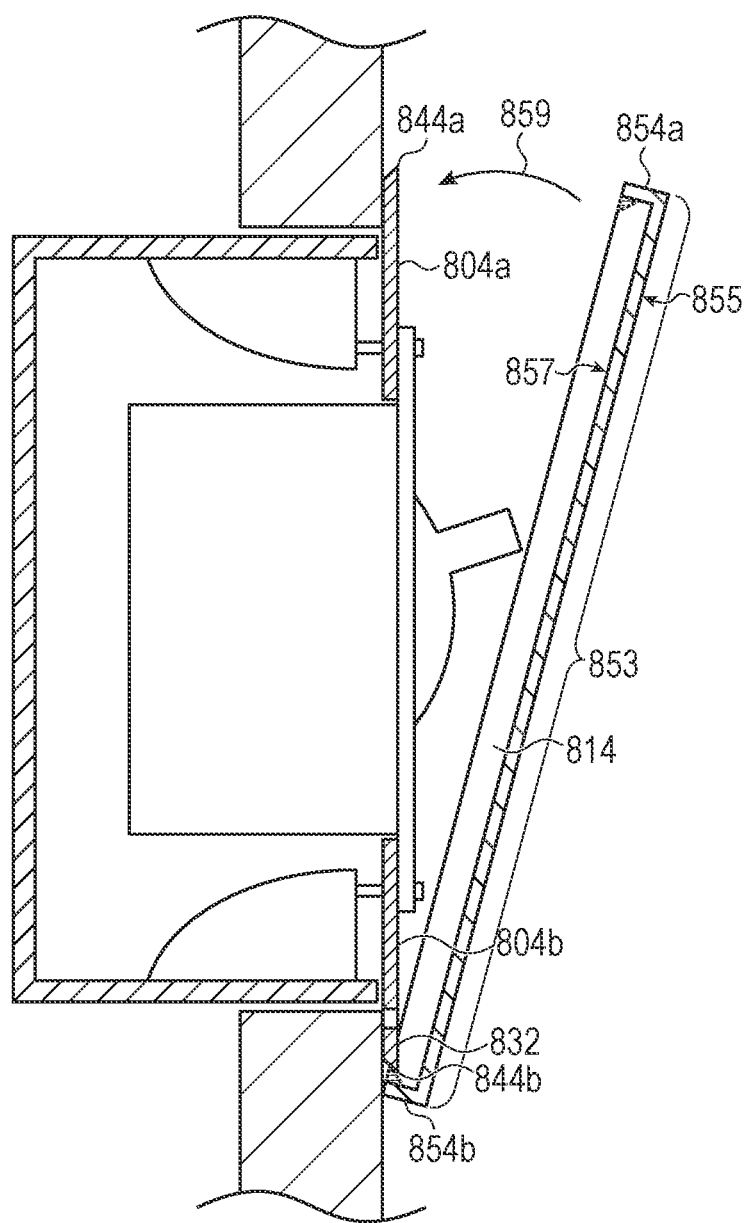
Figure 8D:
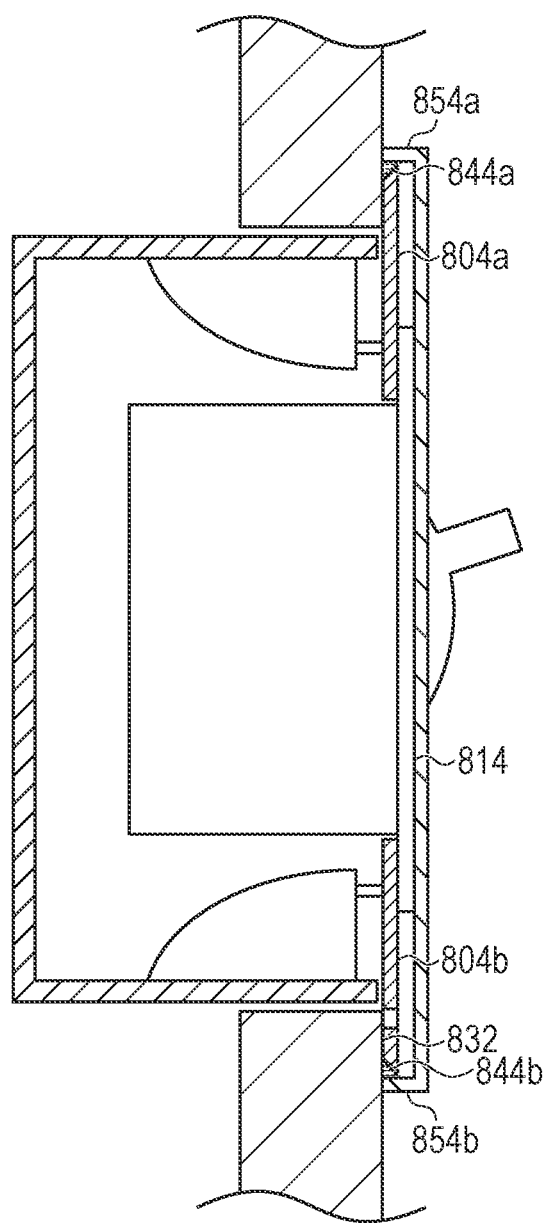

FIGS. 8C-8D depict an example installation process of the cover plate 814 with the first shim 804a and the second shim 804b discussed above. As depicted in FIG. 8C, the cover plate may define a cover portion 853. The cover portion may define an exterior side 855 and an interior side 857. Also, the cover plate 814 may comprise a first engagement feature 854a positioned at a first edge of the cover portion 853 along the interior side of the cover plate, and a second engagement feature 854b positioned at a second edge of the cover portion 853 along the interior side of the cover plate 814. The first engagement feature 854a and the second engagement feature 854b can be configured to engage with the corresponding engagement features 844a, 844b of the first shim 804a and the second shim 804b, respectively.

To install the cover plate 814, as shown in FIGS. 8C-8D, a user may angle the cover plate 814 such that a nearest portion of the cover plate 814 to the electrical assembly is angled to fit over the second shim 804b and the spring cleat 832. For example, the cover plate 814 is positioned relative to the second shim 804b such that the engagement feature 854b of the cover plate 814 engages the engagement feature 844b of the spring cleat 832 (e.g., the angled surfaces of the biasing members 833). Using the cover plate 814, the user may apply a force to the spring cleat 832 in order to compress the spring cleat 832 (e.g., the biasing members 833). The user may then pivot the cover plate 814 about the spring cleat 832 and towards the first shim 804a, as illustrated by arrow 859, ultimately positioning the engagement feature 854a of the cover plate 814 into engagement with the engagement feature 844a of the first shim 804a. The user may then release the cover plate 814, which allows the biasing members 833 of the spring cleat 832 to impart a biasing force to the cover plate 814 to force the engagement features of the shims into engagement with the corresponding engagement features of the cover plate 814, as shown in FIG. 8D. As described herein, the angled surfaces of the engagement features may also apply a force that draws the cover plate 814 towards and optionally into contact with the wall surrounding the electrical box.

As presented in FIG. 8D, the spring cleat 832 may remain in a fully-compressed or partially-compressed state when the cover plate 814 is installed (e.g., engaged with the first and second shims 804a, 804b), thereby applying a biasing force to the cover plate 814. The biasing force may maintain the engagement between the cover plate and the first shim 804a, such as by maintaining a biasing force between the corresponding surfaces of the engagement features. The biasing force may also maintain the engagement between the cover plate and the second shim 804b. In some cases, the spring cleat 832 may be uncompressed while the cover plate 814 is in place, but the engagement surfaces of the spring cleat 832 and the cover plate may at least partially overlap one another to retain the cover plate 814 to the shims.

In some implementations, each of the shims 804a/804b may include magnets or ferromagnetic material 820. Additionally, the cover plate 814 may include corresponding magnets/ferromagnetic material positioned to magnetically couple to the corresponding magnets or ferromagnetic material 820 of the shims, thereby magnetically coupling the cover plate 814 to the shims. In some cases, the magnetic coupling between the cover plate and the shims supplements the retention forces provided by spring cleat on the shim. The magnetic coupling may also inhibit rattling or other relative movement of the cover plate 814 that may negatively impact the operation and/or function of the cover plate.

The spring cleat 832 (and/or the biasing member(s) of a spring cleat) may be formed from or may include any material with sufficient elasticity or resilience to allow deflection during installation of a cover plate and also impart a persistent return or biasing force after installation of the cover plate. For example, the spring cleat 832 may be formed from or include a compliant plastic (e.g., polylactic acid, acrylonitrile butadiene styrene, or nylon), a metal, and so on.

In some cases, the base portion 808 and the spring cleat 832 (e.g., the biasing members 833) may be a single, unitary structure. For example, the second shim may be a single piece of metal (e.g., a stamped metal component), in which the base portion 808 and the spring cleat 832 are part of the same metal structure. As another example, the second shim may be formed as a single polymer piece (e.g., a unitary polymer structure formed by molding or another suitable process), in which the base portion 808 and the spring cleat 832 are part of the same polymer structure. According to other embodiments, the spring cleat 832 (e.g., the biasing members 833) and the base portion may be separate components coupled together. In some examples, the spring cleat 832 is removably coupled to the base portion 808 (e.g., via screws, clips, etc.). In other examples, the spring cleat 832 may be permanently coupled, such as welded, to the base portion 808.

FIG. 8A depicts optional magnets within the respective shims 804a/804b in a different arrangement than those discussed with respect to FIGS. 1A-7B. The magnets may be made smaller, so not to extend beyond a peripheral edge of the shims 804a/804b. In addition, the magnets may have a square shape rather than a circular shape. The magnets may also have a top surface that is substantially flush with a top surface of the respective shims 804a/804b. In some cases, the shims 804a, 804b may optionally include magnets having the size, shape, and/or position on the shims as those described with respect to FIGS. 1A-7B.

FIGS. 8A-8D illustrate one example configuration of a spring cleat. Another example spring cleat 832 may include helical or coil springs, optionally with engagement features such as blocks with angled engagement surfaces that engage the engagement features on the cover plate. Another example spring cleat 832 may include a compliant material (e.g., an elastomeric material) coupled to the base portion and configured to engage the cover plate (or provide a biasing force to an engagement member that defines an engagement surface to engage the cover plate). Other types of spring cleats 832 are also contemplated.

While FIGS. 8A-8D illustrate shims that define engagement features for engaging with the cover plate, in some cases the engagement features may be defined by a different component. For example, the electrical assembly may define the engagement features, and the cover plate may directly engage the engagement features of the electrical assembly. As another example, the electrical box may define the engagement features, and the cover plate may directly engage the engagement features of the electrical box.

Figure 9A:
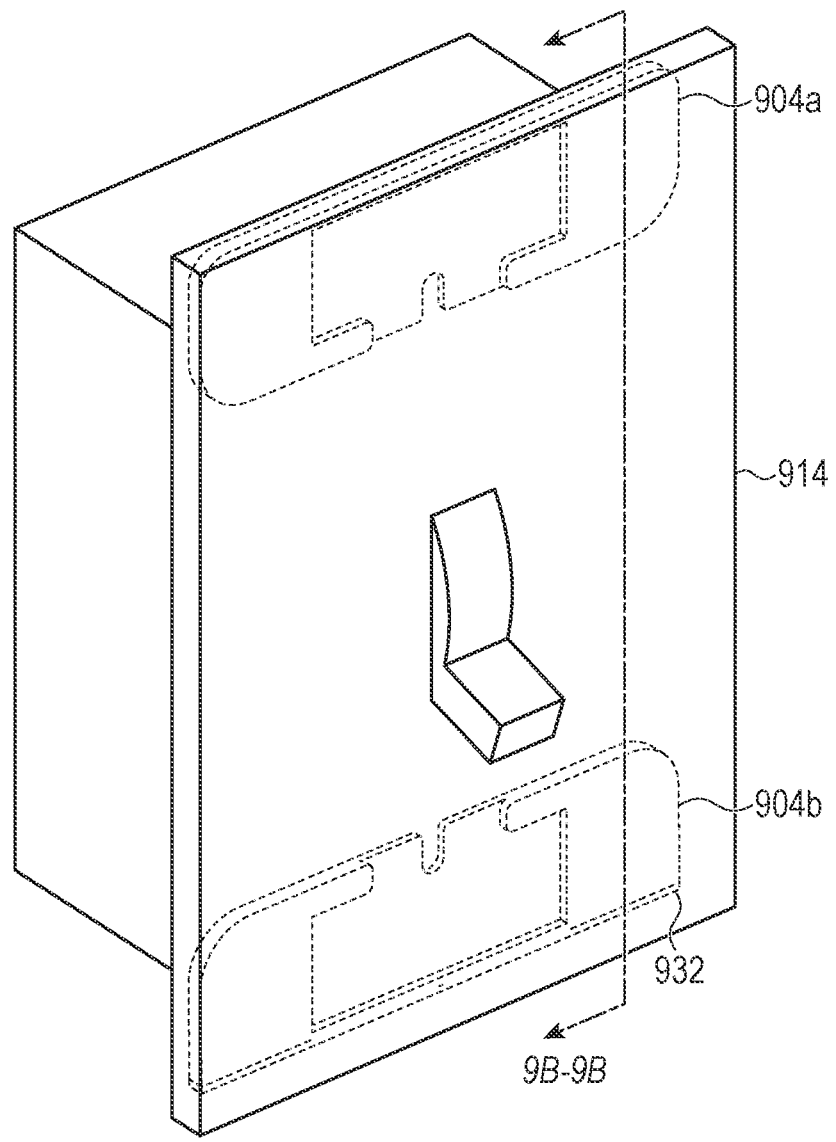
FIGS. 9A-9D illustrate example shims, including one shim having a spring cleat, and securement of the shims with respect to a cover plate, and a spring cleat having a French cleat profile, such as described herein.
Figure 9B:
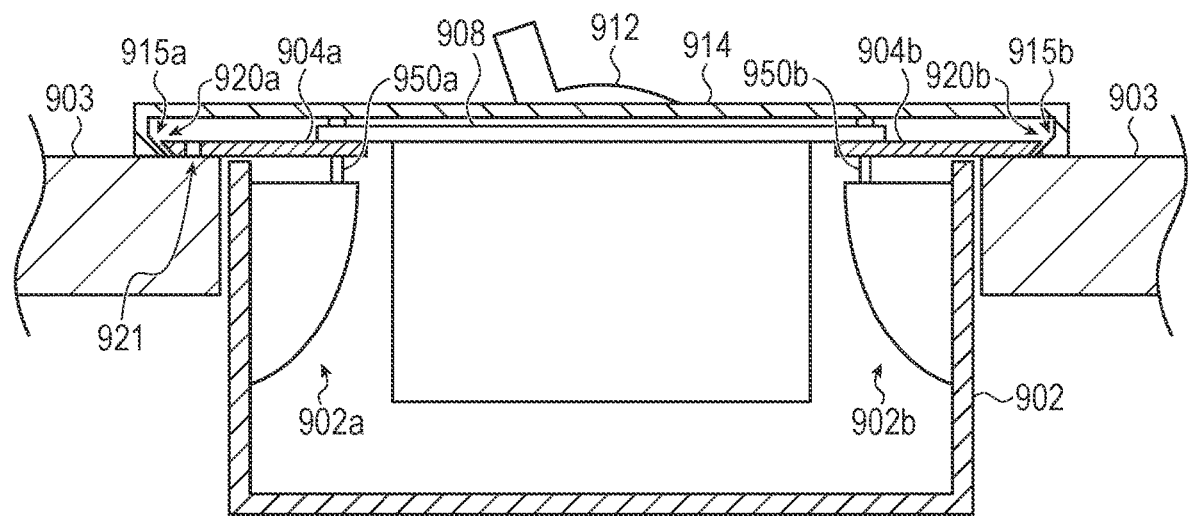
Figure 9C:
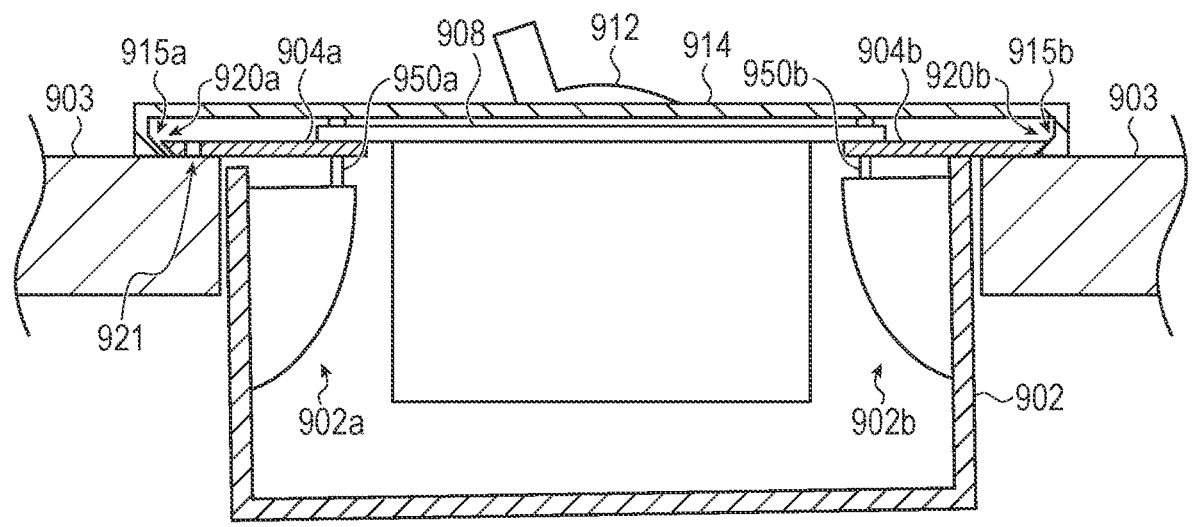

FIGS. 9A-9C illustrate an embodiment of an example cover plate mounting assembly where a cover plate is secured to one or more shims using cleats (e.g., French cleats or spring cleats). As illustrated in FIGS. 9A-9C, the cover plate mounting assembly lacks magnets, though in some cases magnets may be included to facilitate retention and/or alignment. Undescribed portions of the cover plate mounting assembly are omitted here for clarity, but it should be understood that undescribed features may correspond to similar features discussed with respect to FIGS. 1A-8D.

As illustrated in FIG. 9A, a cover plate mounting assembly may include a cover plate 914, a first shim 904a, and a second shim 904b. The second shim 904b may additionally be provided with a spring cleat 932 which secures the second shim 904b to the cover plate 914 when installed. As discussed with respect to FIG. 9B, the spring cleat 932 of the second shim 904b and a cleat feature (e.g., a French cleat) of the first shim 904a may interact with respective features (e.g., sloped or angled surfaces) of the cover plate 914 to bias the cover plate 914 towards a surrounding mounting structure 903 (e.g., a wall, FIG. 9B), thereby providing a high degree of engagement (e.g., contact) between the cover plate 914 and the surrounding mounting structure 903.

FIG. 9B illustrates a cross-sectional view of the cover plate mounting assembly illustrated in FIG. 9A across line 9B-9B. Since the line 9B-9B is not taken across a center portion of the cover plate mounting assembly (e.g., through a center of switch 912), it is noted that some elements (e.g., the elements depicted without cross-section lines) are not bisected and are provided in FIG. 9B to provide structural clarity.

As illustrated in FIG. 9B, a first shim 904a and a second shim 904b may be secured to a switch assembly 908. The second shim 904b comprises a spring cleat 932 (see, e.g., FIG. 9A) and the first shim 904a comprises a static cleat (e.g., French cleat or other cleat that does not impart a spring force on the cover plate). The spring cleat 932 defines a spring member that is separated from a remaining portion of the second shim 904b by a gap 921.

The switch assembly 908 may be secured to an electrical box 902 via a first and a second fasteners 950a/950b and, more specifically, to a first and a second mounting features 902a/902b via the first and second fasteners 950a/950b. The first and second mounting features 902a/902b may define threaded holes to which a portion of the first and second fasteners 950a/950b may be secured.

As discussed above, the first and second shims 904a/904b may be positioned between the switch assembly 908 and the electrical box 902, such that the first and second shims 904a/904b are captive (e.g., sandwiched) between the switch assembly 908 and the electrical box 902. The force applied by the switch assembly 908 and the electrical box 902 on the first and second shims 904a/904b retains the shims 904a/904b in place. The first and second shims 904a/904b may include end portions that include angled surfaces to engage with the cover plate 914. For example, the first shim 904a may include a first angled end surface 920a and the second shim 904b may include a second angled end surface 920b. The cover plate 914 may likewise have angled end surfaces that engage the angled end surfaces of the shims. That is, the cover plate 914 may have a first angled end surface 915a configured to come into contact with the first angled end surface 920a and a second angled end surface 915b configured to come into contact with the second angled end surface 920b. The angled end surfaces may interact such that the respective shims direct or bias the cover plate 914 toward a mounting structure 903, thereby ensuring a secure fit with respect to the mounting structure 903. For example, as shown in FIG. 9B, the second angled end surface 920b of the second shim 904b may be biased against the angled end surface 915*b* of the cover plate by the force of the spring cleat 932 (e.g., in a right-to-left direction relative to the orientation of FIG. 9B). The interfacing angled end surfaces of the second shim 904*b* and the cover plate 914 may convert a portion of the biasing force applied by the spring cleat 932 into a force that draws or biases the cover plate 914 against the mounting structure 903. Thus, as shown in FIG. 9B, as a result of the interfacing angled surfaces and the force from the spring cleat 932, the cover plate 914 is pulled against the mounting structure 903. In addition, the biasing force generated by the spring cleat 932 of the second shim 904*b* may produce a corresponding force with respect to the first shim 904*a*, which may bring the angled end surface 915*a* against the angled end surface 920*a*. This biasing feature can ensure that the cover plate 914 is drawn flat against the mounting structure 903 even in the event that the electrical box 902 is skewed due to poor installation (see, e.g., FIG. 9C).

As depicted in FIGS. 9B-9C, the first shim 904*a* and the second shim 904*b* extend at least partially over the mounting structure 903 such that a portion of the first and second shims 904*a*/904*b* rest on a surface of the mounting structure 903 (e.g., on the surface of a wall). The cover plate 914 is mounted to the first and second shims 904*a*/904*b* and, therefore, the cover plate 914 may be secured to the mounting structure 903 even when an underlying electrical box 902 is misaligned (see, e.g., FIG. 9C).

FIG. 9C illustrates an example cover plate assembly with a skewed or otherwise misaligned electrical box 902. As illustrated in FIG. 9C, the electrical box 902 is misaligned with respect to the surrounding mounting structure 903 (e.g., the wall) such the left and right ends of the electrical box 902 (relative to the orientation in FIG. 9C) are located at different depths relative to the surface of the mounting structure 903. This misalignment may occur, for example, because the electrical box 902 is out-of-plumb, or otherwise is simply misaligned relative to the mounting structure 903. Because the electrical box 902 is misaligned relative to the mounting structure 903, components attached to the electrical box 902 would likewise be misaligned relative to the mounting structure 903. For example, the switch assembly 908, which is attached to the electrical box 902 via the fasteners 950*a*/950*b* is misaligned in accordance with (and as a result of) the misalignment of the electrical box 902. In a conventional cover plate installation, the cover plate 914 is coupled to the switch assembly 908 and would therefore also be skewed relative to the mounting structure 903 (e.g., the wall surface). If the electrical box 902 protruded from the mounting structure 903 at any point, the cover plate 914 may not even contact the mounting structure 903 in that area, leaving an unsightly and potentially dangerous gap between the mounting structure 903 and the cover plate 914.

By attaching the cover plate 914 with the shims 904*a*/904*b*, however, the effect of the misalignment of the electrical box 902 on the alignment of the cover plate 914 may be reduced or eliminated. More particularly, as noted above, the shims 904*a*/904*b* rest on and are thus aligned against the surface of the mounting structure 903 (e.g., the wall), rather than being aligned to the electrical box 902. Accordingly, the engagement between the shims 904*a*/904*b* and the cover plate 914 (e.g., the spring force from the cleat(s) acting on the cover plate 914) draws the cover plate 914 towards and ultimately against the mounting structure 903 (rather than to and/or against the misaligned electrical box 902). For example, a force imparted on the cover plate 914 by the spring cleat of the shim 904*b* (e.g., via the engagement between the second angled end surface 920*b* and the second angled end surface 915*b*) draws the cover plate 914 toward the mounting structure 903, and also causes the first angled end surface 920*a* of the first shim 904*a* to draw the cover plate 914 toward the mounting structure 903. Therefore, the cover plate 914 may be drawn toward the mounting structure 903 and may be positioned flat against the mounting structure 903 despite the skew of the electrical box 902 relative to the mounting structure 903. In this way, the cover plate 914 may be forced or generally biased into contact with the mounting structure 903 to at least partially offset or account for a skew of the electrical box 902. As discussed above, this structure may omit magnets to provide an attachment force between the shims and the cover plate, as the frictional and/or stictional forces between the angled surfaces of the shim and cover plate may be sufficient, though magnets may be provided in accordance with some embodiments.

Figure 9D:
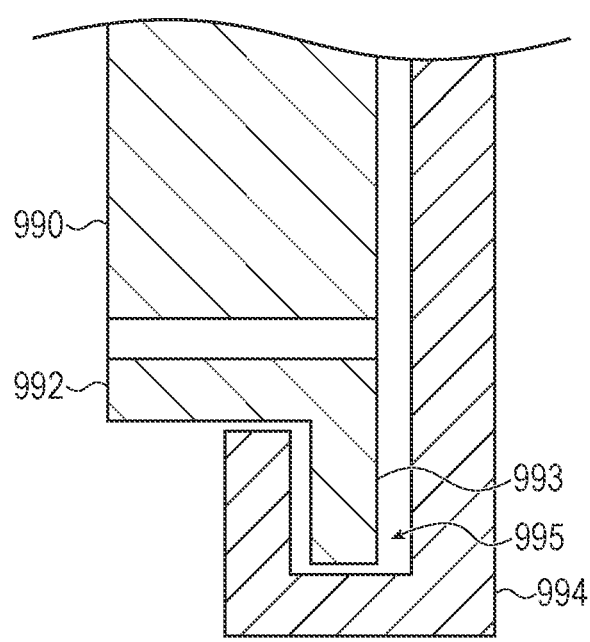

FIG. 9D depicts an embodiment of a shim 990 with a spring cleat 992. While the spring cleats in FIGS. 8A-9C include engagement features that are or include angled surfaces, FIG. 9D illustrates an example in which the spring cleat 992 includes a flange 993 and the cover plate 994 defines a recess 995 that interlocks with the flange 993 of the spring cleat 992. In some embodiments, a shim that does not include a spring cleat may include the same or similar interlocking profile as shown in FIG. 9D.

Figure 10A:
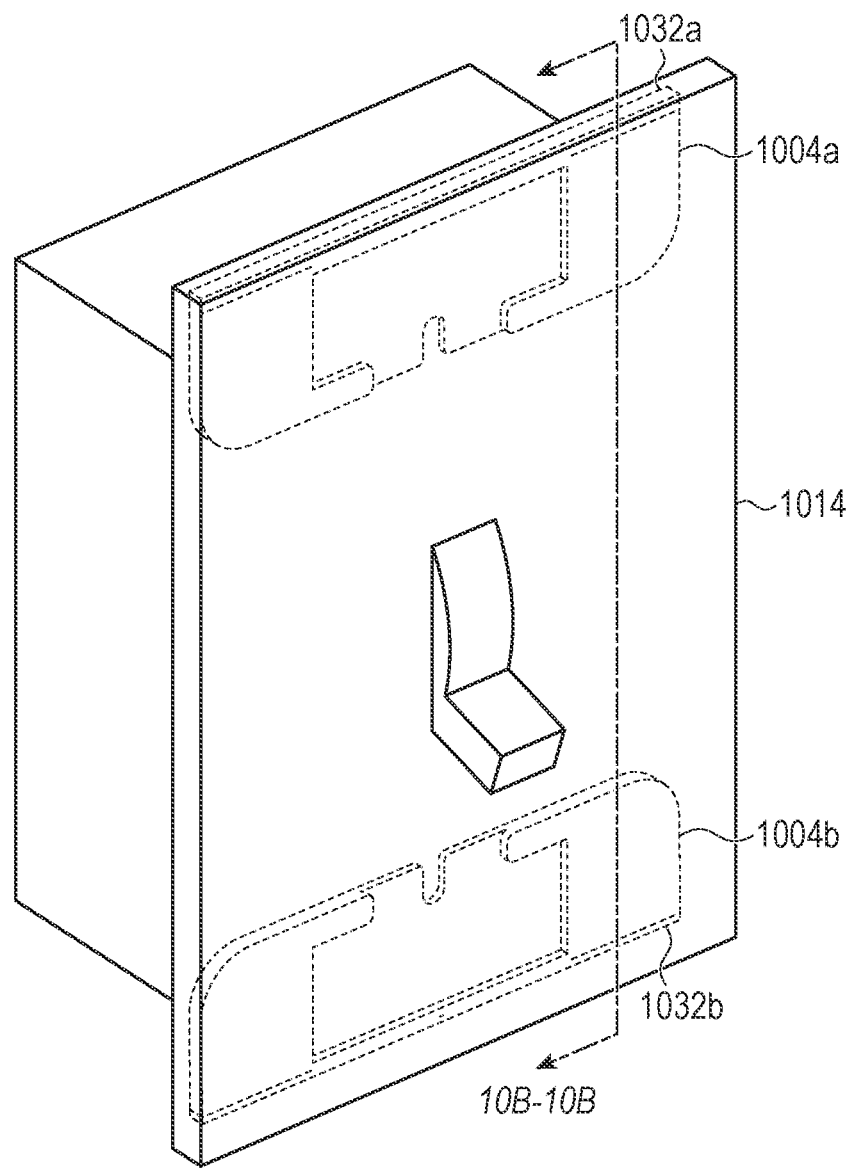
FIGS. 10A-10B illustrate example shims, including both shims having a respective spring cleat, and securement of the shims with respect to a cover plate, such as described herein.
Figure 10B:
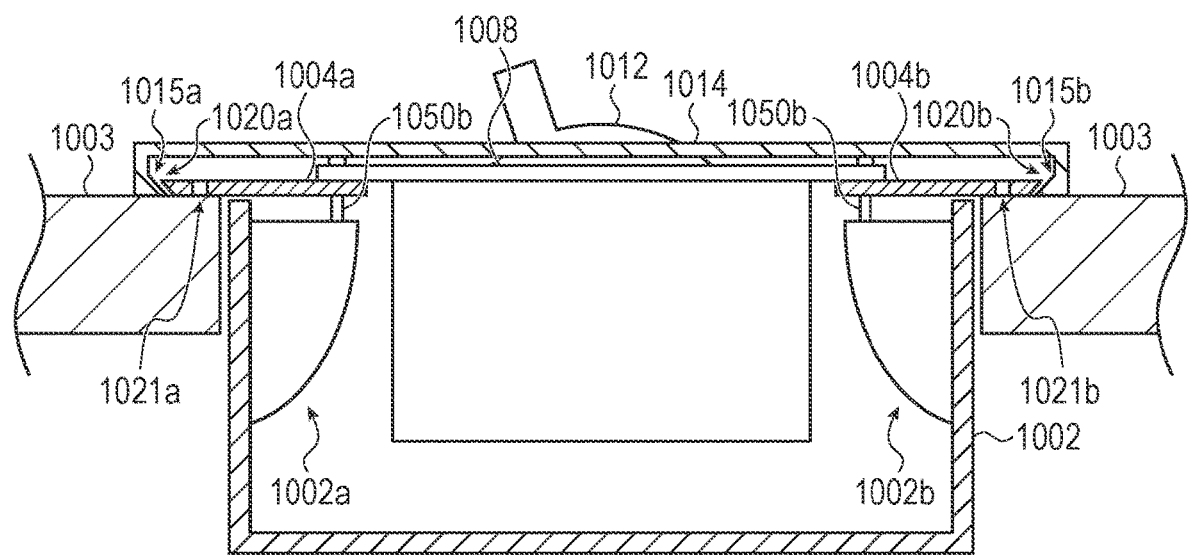

While FIGS. 9A-9C illustrate an example implementation that includes one spring cleat and one static (e.g., French) cleat, FIGS. 10A-10B illustrate an example implementation where both shims 1004*a*/1004*b* include a respective spring cleat 1032*a*/1032*b*. The cover plate assembly may include a cover plate 1014, a first shim 1004*a*, and a second shim 1004*b*. The first and second shims 1004*a*/1004*b* may be configured to secure the cover plate 1014 over an associated electrical assembly (e.g., a switch assembly).

FIG. 10B illustrates a cross-section of the cover plate assembly taken across line 10B-10B as depicted in FIG. 10A. FIG. 10B is substantially similar to the embodiment depicted in FIG. 9B, but instead of having one spring cleat, both the first shim 1004*a* and the second shim 1004*b* comprise a respective spring cleat 1032*a*/1032*b*. That is, the first shim 1004*a* defines a spring member that is separated from a remaining portion of the first shim 1004*a* by a gap 1021*a* and the second shim 1004*b* defines a spring member that is separated from a remaining portion of the second shim 1004*b* by a gap 1021*b*. The cover plate assembly is provided with respect to a mounting structure 1003, on which the cover plate 1014 is positioned, a switch assembly 1008, a switch 1012, and respective fasteners 1050*a*/1050*b* securing the switch assembly 1008 to respective shims 1004*a*/1004*b*.

The first angled end surface 1020*a* of the first shim 1004*a* may engage with the first angled end surface 1015*a* of the cover plate 1014. Additionally, the second angled end surface 1020*b* of the second shim 1004*b* may engage with the second angled end surface 1015*b* of the cover plate 1014. For example, a force imparted on the cover plate 1014 by the shims 1004*a*/1004*b* (e.g., via the angled end surfaces) draws the cover plate 1014 toward the mounting structure 1003. In this way, the cover plate may be secured to the shims 1004*a*/1004*b* and installed on the mounting structure. While magnets are not illustrated in FIGS. 10A-10B, magnets may be provided in some implementations.

As depicted in FIGS. 10B, the first shim 1004*a* and the second shim 1004*b* extend at least partially over the mounting structure 1003 such that a portion of the first and second shims 1004*a*/1004*b* rest on a top surface of the mounting structure 1003. The cover plate 1014 is mounted to the first and second shims 1004*a*/1004*b* and, therefore, the cover plate 1014 may be secured to the mounting structure 1003 even when an underlying electrical box 1002 is misaligned.

As noted with respect to FIG. 9B, the electrical box 1002 may include a first protrusion 1002*a* and a second protrusion 1002*b* into which respective fasteners 1050*a*/1050*b* may be received. In this way, the shims 1004*a*/1004*b* may be secured to the electrical box 1002.

Figure 11A:
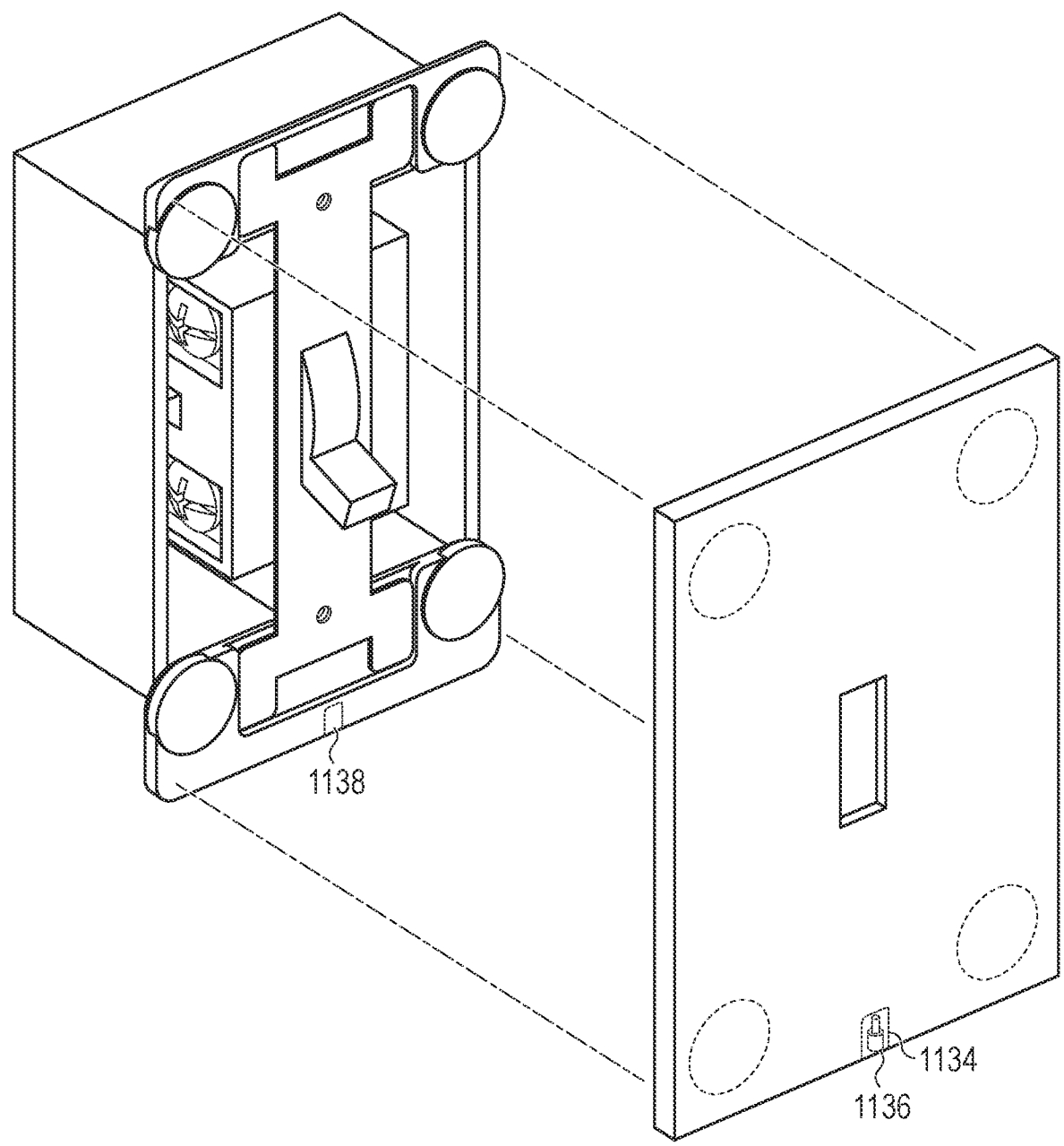
FIGS. 11A-11B illustrate an example magnetic cover plate mounting assembly with an associated locking mechanism, such as described herein.
Figure 11B:
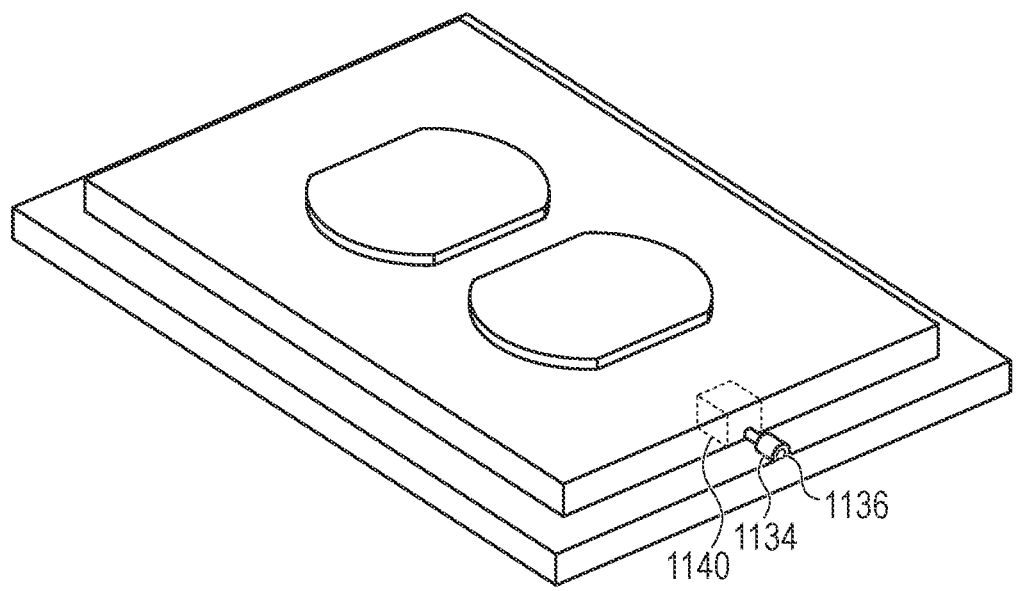

FIGS. 11A-11B illustrate an example magnetic cover plate mounting assembly including a locking mechanism. Undescribed portions of the magnetic cover plate mounting assembly are omitted here for clarity, but it should be understood that undescribed features may correspond to similar features discussed with respect to FIGS. 1A-9C.

As depicted in FIG. 11A, a locking mechanism may be provided on one or both of a magnetic cover plate or a magnetic shim. The locking mechanism may comprise any kind of lock such as a cam lock, a sliding pin lock, a sliding bolt lock, any combination thereof, and so on.

The magnetic cover plate mounting assembly may be formed with a locking cavity 1138. The locking cavity 1138 may be formed by removing material from the magnetic shim in order to form an empty space. The locking cavity 1138 may be formed as a channel such that locking pin 1134 may be inserted into the locking cavity 1138.

The magnetic cover plate may have a locking pin 1134 and a pin channel 1136. The locking pin 1134 may be formed from a ferromagnetic material and may be positioned within the pin channel 1136. In some cases, the locking pin 1134 is a magnetic screw or nail. The locking pin 1134 may be slidably arranged within the pin channel 1136.

The locking pin 1134 may comprise two states. A first state may be an engaged position and the second state may be an unengaged position. The locking pin 1134 may be moved from the engaged position to the unengaged position by an external magnet positioned proximate to the locking mechanism. That is, when a magnet is placed proximate to the locking mechanism, the locking pin 1134 may be attracted to the magnet, as the locking pin 1134 is formed from a ferromagnetic material, and may move toward an unengaged position.

When the locking pin 1134 is in the unengaged position, the magnetic cover plate may be able to be installed with the magnetic shims. That is, the locking pin 1134 may not interfere with walls of the magnetic shims. Once the external magnet is removed, the locking pin 1134 may move toward the engaged position. This may occur due to gravitational forces or may occur due to the presence of a biasing element that provides a force toward the locking pin 1134. As the external magnet is removed, the locking pin 1134 may enter the locking channel 1136, thereby locking the magnetic cover plate and the magnetic shims. To release the magnetic cover plate from the magnetic shim, the external magnet may be re-applied to transition the locking pin 1134 from the engaged position to the unengaged position.

Though the locking mechanism is illustrated on a bottom portion of the magnetic cover plate mounting assembly depicted in FIG. 11A, it is appreciated that a locking mechanism may be provided on a top portion of the magnetic cover plate mounting assembly. In such implementations, a locking pin may be slid into a locking cavity via gravitational forces and may be removed by an external magnet.

FIG. 11B illustrates another example of such a locking mechanism. In FIG. 11B, an internal magnet 1140 may be provided along with a locking pin 1134 and a pin channel 1136. The internal magnet 1140 may attract the locking pin 1134 such that, when the locking pin 1134 is proximate to the internal magnet 1140, the locking pin 1134 moves toward the internal magnet 1140 to lock a magnetic cover plate with a magnetic shim. In order to disengage the locking pin 1134, a stronger external magnet (e.g., an external magnet stronger than the internal magnet 1140) may be provided proximate to the locking pin 1134.

Though various holes are depicted in FIGS. 11A-11B, with respect to a magnetic cover plate, any type of magnetic cover plate may be used. In some cases, the magnetic cover plate has no holes and appears as a blank cover. This may be used in order to completely block an electrical outlet, to prevent children from engaging with the electrical outlet or to block an unused or deactivated electrical outlet (or an electrical box that lacks a switch, receptacle, or other electrical assembly).

Though the term "magnetic" is used with respect to the magnetic cover plate and the magnetic shims, it is appreciated that the locking mechanism described herein may be used with any cover plate and shim, including non-magnetic cover plates and shims.

Figure 12A:
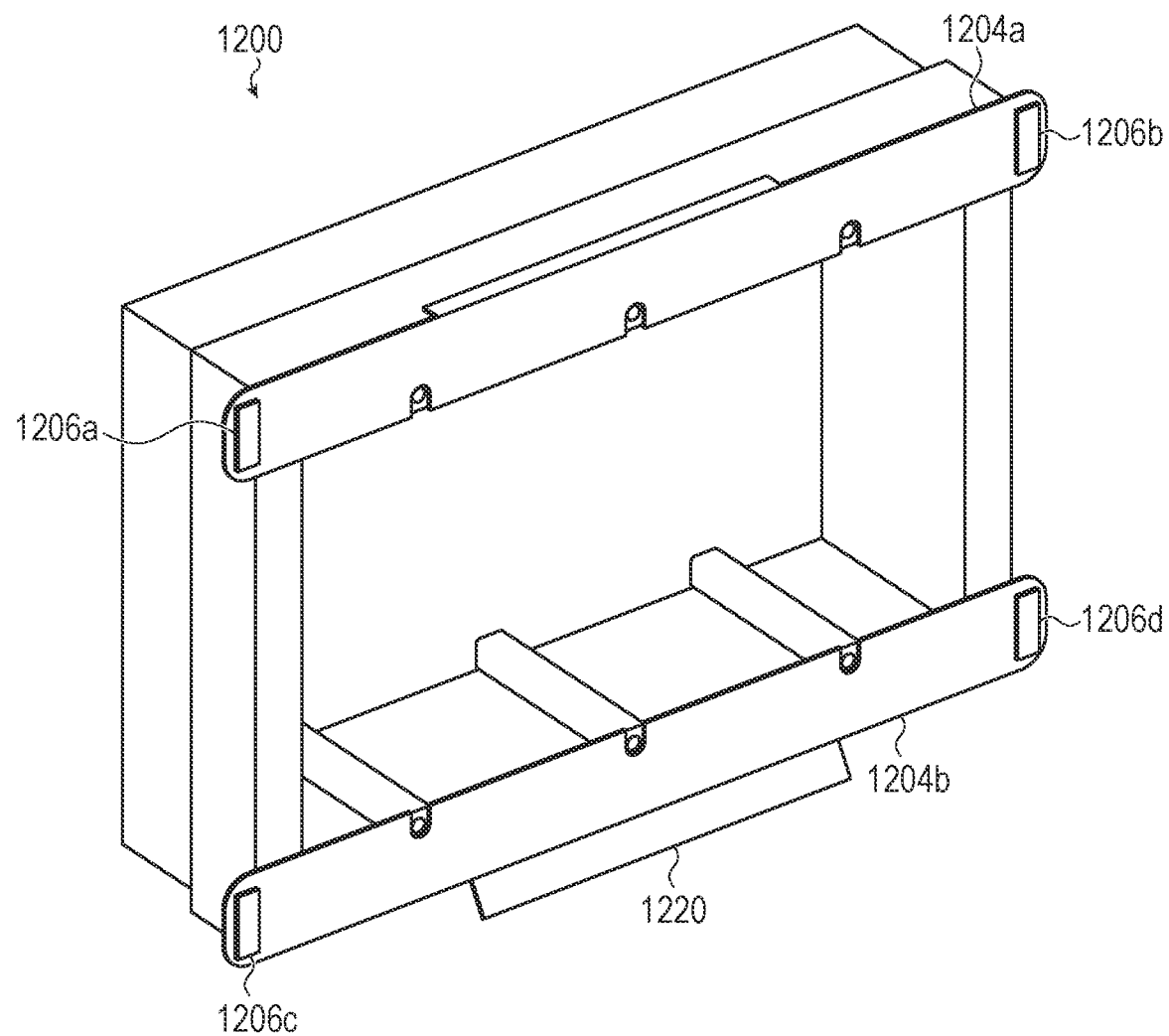
FIGS. 12A-12B illustrate an example expanded magnetic cover plate mounting assembly, such as described herein.
Figure 12B:
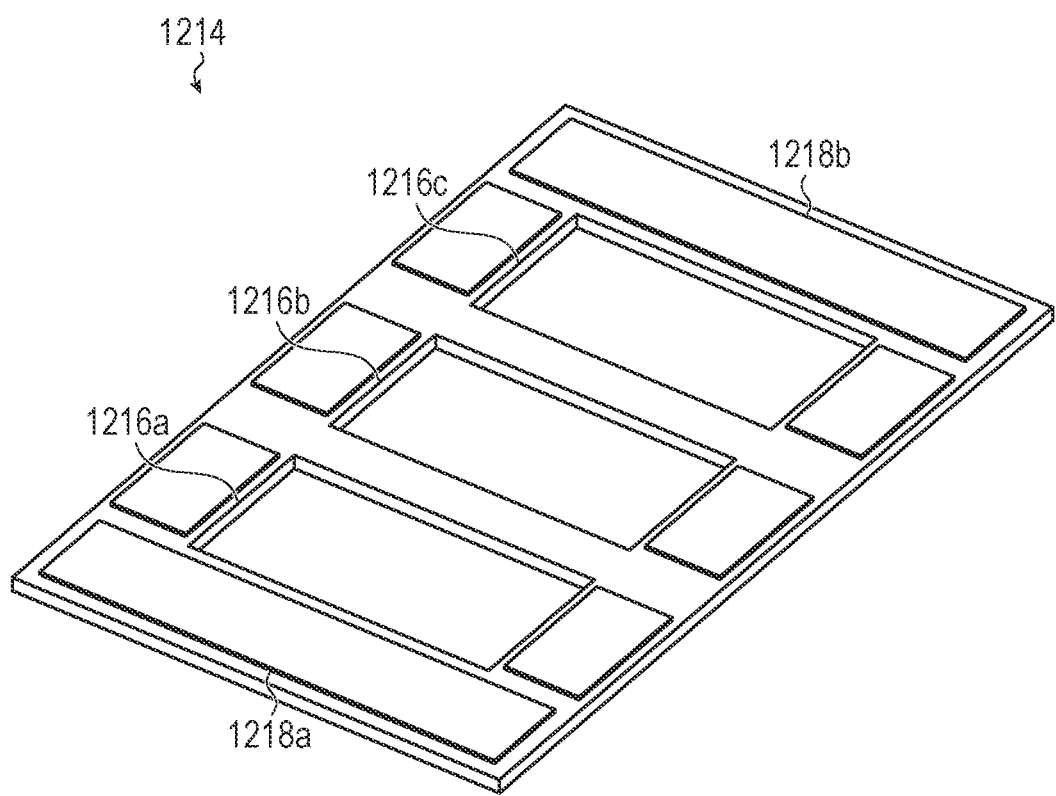

FIGS. 12A-12B illustrate an assembly 1200 with a multi-gang electrical box and a corresponding magnetic cover plate. As depicted in FIG. 12A, the multi-gang electrical box is three gangs long and can enclose three electrical assemblies. A first magnetic shim 1204*a*, a second magnetic shim 1204*b*, a first magnet 1206*a*, a second magnet 1206*b*, a third magnet 1206*c*, and a fourth magnet 1206*d* may be positioned on top of the multi-gang electrical box, as depicted in FIG. 12A.

The first magnetic shim 1204*a* and the second magnetic shim 1204*b* may be fully, or partially, magnetic or formed from a ferromagnetic material. The magnetic shims 1204*a*/1204*b* may additionally extend beyond an edge of an associated electrical box to allow for a heightened degree of freedom when installing a magnetic cover plate over the multi-gang electrical box. In some cases, the second magnetic shim 1204*b* is provided with a cleat to provide for a contact between a wall, structure, or mounting surface and the second magnetic shim 1204*b* and/or a magnetic cover plate.

As illustrated in FIG. 12A, each of the magnetic shims 1204*a*/1204*b* may be provided with multiple notches so as to expose fastener holes (e.g., screw holes) as may be provided on an electrical box. The exposed fastener holes are to couple the electrical box with an electronic assembly, as discussed above. However, the electronic assemblies themselves are omitted in FIG. 12A for clarity of the additional elements.

As depicted, the second magnetic shim 1204*b* may include a cleat 1220 to couple with an associated magnetic cover plate (e.g., magnetic cover plate 1214). The cleat 1220 may be provided on one magnetic shim (e.g., the second magnetic shim 1220), both magnetic shims, or neither magnetic shim. In some implementations, the magnets or ferromagnetic material may be omitted, and the magnetic shims may couple to the magnetic cover plate entirely through frictional/stictional forces.

FIG. 12B illustrates an example magnetic cover plate 1214. The magnetic cover plate 1214 may be installed with the magnetic shims 1204*a*/1204*b* depicted in FIG. 12A. The magnetic cover plate 1214 is illustrated with holes corresponding to paddle switches, though any type or any number of holes may be provided.

As illustrated in FIG. 12B, the magnetic cover plate 1214 may include a first magnet 1218*a* and a second magnet 1218*b*. The respective magnets 1218*a*/1218*b* may extend across a width of the magnetic cover plate 1214. The first magnet 1218a may be configured to couple with the first magnet 1206a and the third magnet 1206c as provided on the first magnetic shim 1204a and the second magnetic shim 1204b, respectively. In some cases, the first magnet 1218a is split into two or more magnets. The second magnet 1218b may be configured to couple with the second magnet 1206b and the fourth magnet 1206d as provided on the first magnetic shim 1204a and the second magnetic shim 1204b, respectively. In some cases, the second magnet 1218b is split into two or more magnets. Though described as magnets, it is appreciated that the magnets 1218a/1218b may be formed from any ferromagnetic material.

The magnetic cover plate 1214 may additionally include a number of holes. For example, a first hole 1216a, a second hole 1216b, and a third hole 1216c may be provided. In some cases, additional magnets may be provided at end portions of each hole. These magnets may be configured to couple with a ferromagnetic material of the first magnetic shim 1204a and the second magnetic shim 1204b. In some embodiments, these additional magnets are omitted.

Figure 13A:
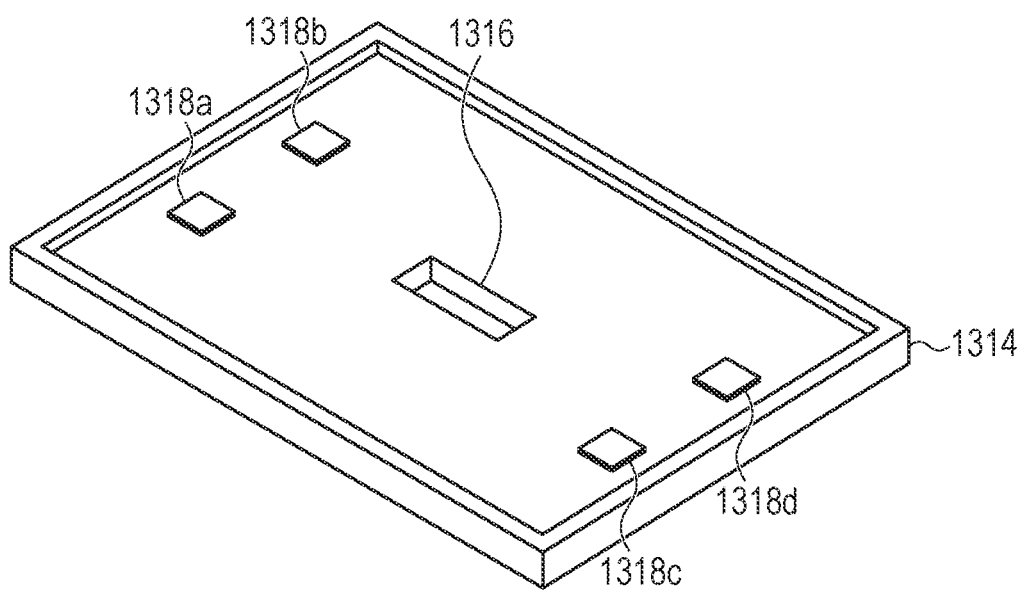
FIGS. 13A-13B illustrate example arrangements of magnets on a magnetic cover plate assembly, such as described herein.
Figure 13B:
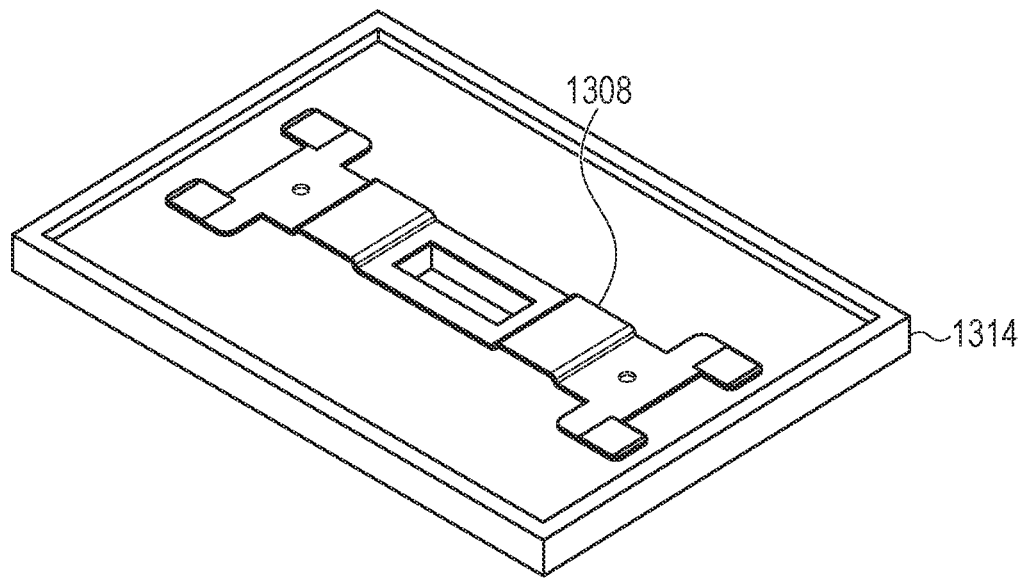

FIGS. 13A-13B illustrate an alternate arrangement of magnets on a magnetic cover plate 1314. As illustrated in FIG. 13A, a magnetic cover plate 1314 may include a hole 1316. Though the hole 1316 in FIG. 13A is depicted as a hole for a light switch, any sized hole, or number of holes, may be provided in accordance with the provided disclosure.

The magnetic cover plate 1314 may additionally be provided with a set of magnets (e.g., a first magnet 1318a, a second magnet 1318b, a third magnet 1318c, and a fourth magnet 1318d). The four magnets may be positioned so as to couple with prong portions of an electrical assembly 1308, as depicted in FIG. 13B. In this way, the magnetic shims, such as discussed above, may be removed from the system and the magnetic cover plate 1314 may be configured to directly couple with the electrical assembly 1308.

The set of magnets may be provided in any number of positions, and with any number of shapes, so as to couple with the electrical assembly. Additionally, or alternatively, the set of magnets may be formed from any ferromagnetic material. The example provided in FIGS. 13A-13B is proved only for exemplary purposes and is not limited to any one particular embodiment.

Figure 14:
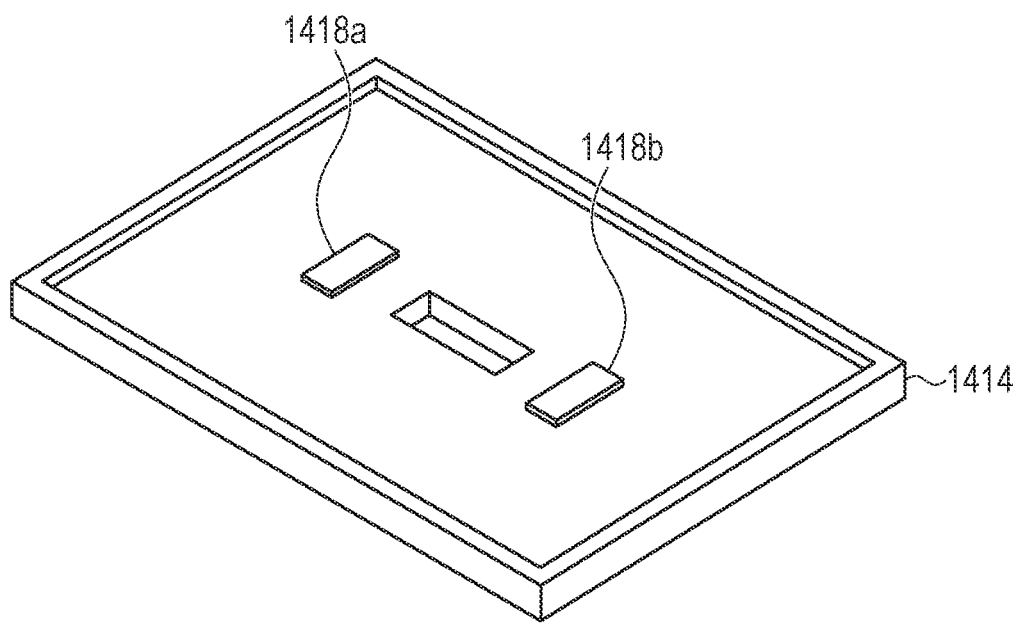
FIG. 14 illustrates an additional example arrangement of magnets on a magnetic cover plate assembly, such as described herein.

FIG. 14 illustrates an additional example of a magnetic cover plate 1414 with a set of magnets (e.g., a first magnet 1418a and a second magnet 1418b). The set of magnets may be configured to couple with a central portion of an electrical assembly. In this way the magnetic cover plate 1414 may be installed on an extended electrical box.

Figure 15:
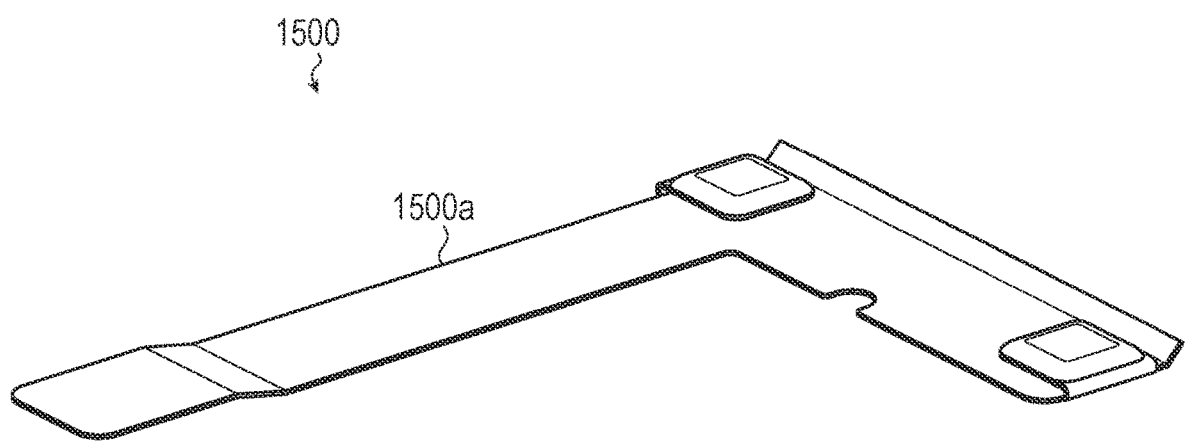
FIG. 15 illustrates an example magnetic shim including an extended side arm, such as described herein.

FIG. 15 illustrates an additional example of a magnetic shim 1500 in accordance with the provided disclosure. The magnetic shim 1500 may include an extended arm 1500a that extends along a length of an associated electrical box when the magnetic shim 1500 is installed on the electrical box. The extended arm 1500a may cover or hide internal electrical components when a magnetic cover plate is removed. Though only one extended arm 1500a is depicted in FIG. 15, a magnetic shim may include two extended arms along both ends.

In such cases, a second magnetic shim having no extended arms may be used as the second magnetic shim (e.g., on the other end of the electrical assembly). In some cases, two magnetic shims each having two arms are used, and the arms of the two shims may overlap. In some implementations, two of the magnetic shims depicted in FIG. 15 may be used in an installation. In such cases, the single arm of the top magnetic shim may extend along one side of the electrical assembly (thereby covering or hiding wires or other electrical components along that side), while the single arm of the bottom magnetic shim may extend along the other side of the electrical assembly (thereby covering or hiding wires or other electrical components along that side).

In any of the embodiments described with reference to FIGS. 1A-15, any number of magnets on any described and/or illustrated magnetic cover plate may be omitted. In such cases, the magnetic cover plate itself may be formed from a ferromagnetic material, such as a ferromagnetic steel, so as to couple/attract the magnets positioned on the magnetic shims. Alternatively, the cover plate mounting assembly may have one or more magnets omitted and may be formed from a ferromagnetic material. In such cases, the magnetic cover plate may include one or more magnets to couple with the magnetic shims. In addition, magnets may be completely removed from any number of components as described above.

Any of the discussed elements (e.g., a cover plate or magnetic shims) may be formed from any number of materials, such as a compliant plastic, a metallic material, a fabric material, a wood, or any combination thereof. For example, magnetic shims and the cover plate may be formed from polylactic acid, acrylonitrile butadiene styrene, or nylon. Ferromagnetic/magnetic portions may be formed from, for example, iron or neodymium.

Portions of the magnetic shims and/or the magnetic cover plate may be formed from or include any suitable material, such as a ferromagnetic material, a plastic, a resin, a wood, a non-ferromagnetic material, metal, any combination thereof, and so on. If either the magnetic shims or the magnetic cover plate are formed from any kind of non-ferromagnetic material, then magnets may be affixed to the magnetic shims and/or the magnetic cover plate, as discussed herein. The magnets may be affixed through the use of any adhesive, friction fit mechanism, epoxy, and so on. The magnets may be embedded through injection molding or through any other manufacturing technique.

Though magnetic embodiments are discussed above, in some implementations, any magnetic components may be removed and shims with static and/or spring cleats may be used to frictionally affix a cover plate to the shims.

Figure 16A:
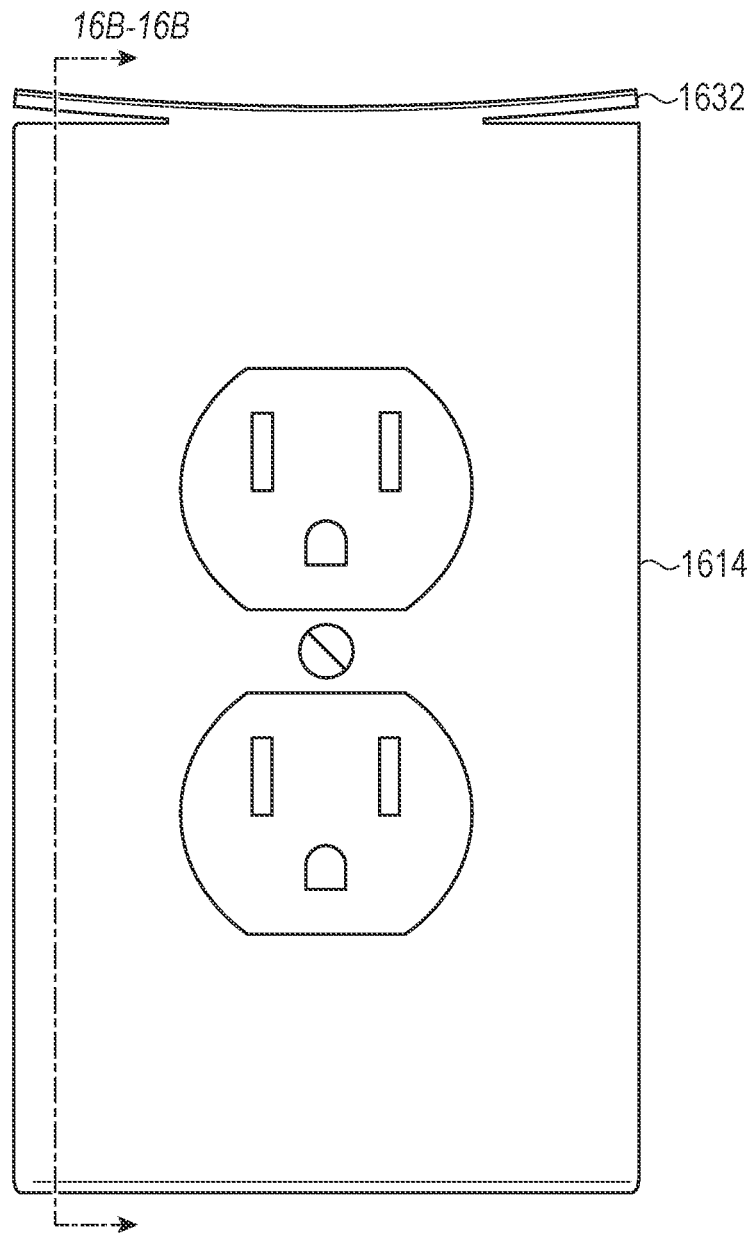
FIGS. 16A-16C illustrate an example of a cover plate having a spring cleat on its outside surface and an additional cover configured to be installed over the cover plate, such as described herein.
Figure 16B:
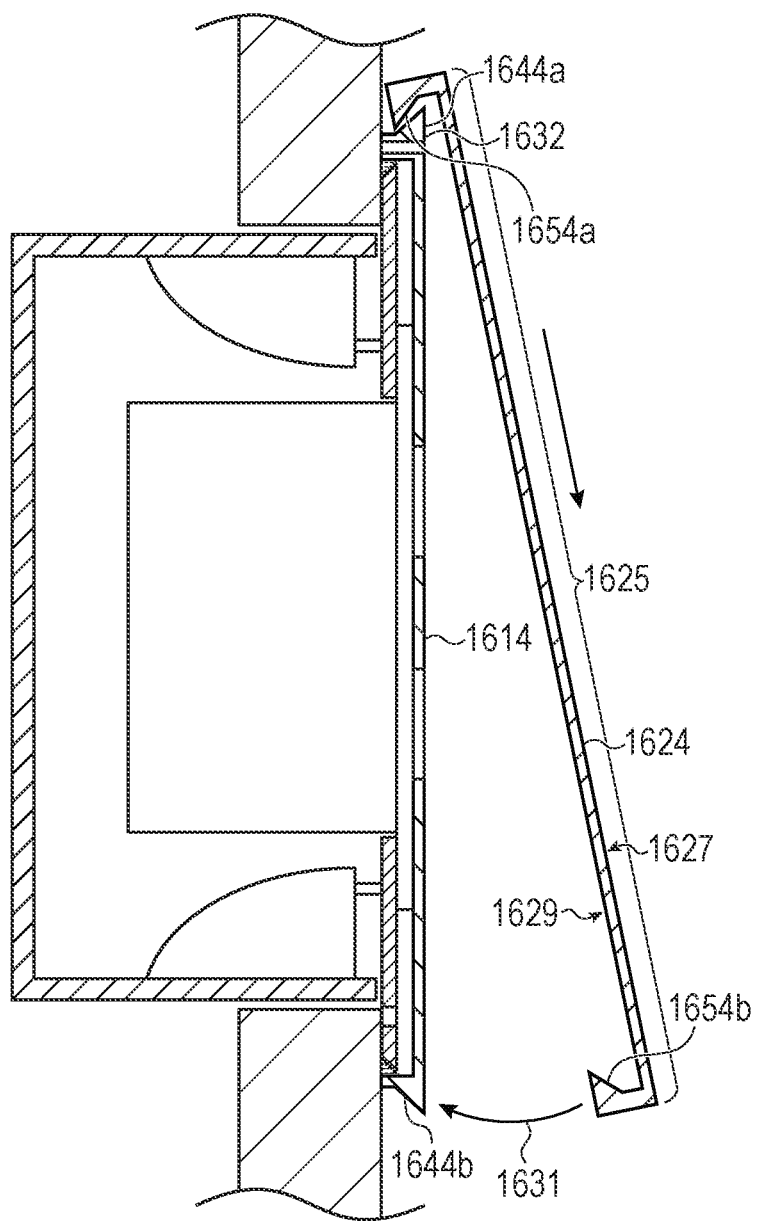

FIGS. 16A-16B illustrate another example of a cover plate 1614. In this example, the cover plate 1614 defines an attachment mechanism that allows an additional cover plate (e.g., the additional cover plate 1624, FIG. 16B) to be releasably attached to the cover plate 1614. The additional cover plate 1624 may be a blank cover plate (e.g., to cover a switch or outlet for safety reasons), a decorative cover plate, or the like. As shown and described herein, the attachment mechanism may be or may resemble a spring cleat, though other attachment mechanisms may also be used. For example, the cover plate 1614 may include magnets, latches, cleats, Velcro, or any other suitable attachment mechanism that facilitates releasable coupling of the additional cover plate to the cover plate. Also, the additional cover plate may include complementary components, materials, structures, and the like, to facilitate the releasable coupling.

With reference to FIGS. 16A-16B, the cover plate 1614 may engage with a spring cleat of a shim, as shown in FIGS. 8A-8D, to couple the cover plate 1614 to an electrical assembly and/or electrical box, or it may couple to an electrical assembly or electrical box in another way (e.g., via a screw or other fastener). The cover plate 1614 includes a spring cleat 1632 that is configured to engage with an additional cover plate 1624 (FIG. 16B) to retain the additional cover plate 1624 to the cover plate 1614. The additional cover plate 1624 may define a barrier portion 1625. The barrier portion 1625 may define an exterior side 1627 and an interior side 1629.

The spring cleat 1632 may have the same or similar structure as the spring cleat 832 (as shown in FIG. 8A) and may operate in the same or similar manner. For example, as shown in FIG. 16B, the spring cleat 1632 may define an engagement feature 1644*a* (e.g., an angled surface, a flange, or any other suitable engagement feature) that is configured to engage a corresponding engagement feature 1654*a* of the additional cover plate 1624. The engagement feature 1654*a* may be positioned at a first edge of the barrier portion 1625 along the interior side 1629 of the additional cover plate.

The spring cleat 1632 may be or may include one or more biasing members. Similar to other embodiments described above, the material of the spring cleat 1632 (and/or the biasing members) may be any material with sufficient elasticity or resilience to allow deflection during installation of the additional cover plate 1624, and also impart a biasing force on the additional cover plate 1624 after installation of the additional cover plate 1624. For example, the spring cleat 1632 may be formed from or include a compliant plastic (e.g., polylactic acid, acrylonitrile butadiene styrene, or nylon), a metal, an elastomer, coil springs, etc. The spring cleat 1632 may be formed from the same or different material as the cover plate 1614, and may be unitary with the cover plate 1614, or formed as a separate component or structure that is attached to the cover plate 1614.

The cover plate 1614 may also define a second engagement feature 1644*b* (e.g., an angled surface, a flange, or any other suitable engagement feature) that is configured to engage a corresponding engagement feature 1654*b* of the additional cover plate 1624. The second engagement feature 1644*b* may be positioned opposite the spring cleat 1632. The corresponding engagement feature 1654*b* may be positioned at a second edge of the barrier portion 1625 along the interior side 1629 of the additional cover plate. The second edge of the barrier portion may be opposite of the first edge of the barrier portion.

As illustrated in FIG. 16B, a user may install an additional cover plate 1624 over the cover plate 1614. In some embodiments, the additional cover plate 1624 may provide child protection, may act as a safety barrier from accidental contact with live current, or may provide aesthetic improvements while the outlet is not in use. The additional cover plate 1624 may include engagement features 1654*a*/1654*b* configured to engage with and/or interlock with the cover plate engagement features 1644*a*/1644*b*. To install, a user may angle the additional cover plate 1624 such that a nearest portion of the additional cover plate 1624, the engagement feature 1654*a*, to the cover plate 1614 is angled to fit over the spring cleat 1632. Using the additional cover plate 1624, the user may apply force to the spring cleat 1632. Upon compressing the spring cleat 1632 (similar to the process described with respect to FIGS. 8A-8D), the user may then pivot the additional cover plate 1624 about the spring cleat 1632 and towards the second engagement feature 1644*b* of the cover plate 1614, as illustrated by arrow 1631, ultimately positioning the engagement feature 1654*b* of the additional cover plate 1624 into the engagement feature 1644*b* of the cover plate 1614. The user may then release the additional cover plate 1624, which may allow the spring cleat 1632 to impart a biasing force to the additional cover plate 1624 to force the engagement features of the additional cover plate into engagement with the engagement features of the cover plate. To uninstall, a user may conduct this operation in reverse.

Figure 16C:
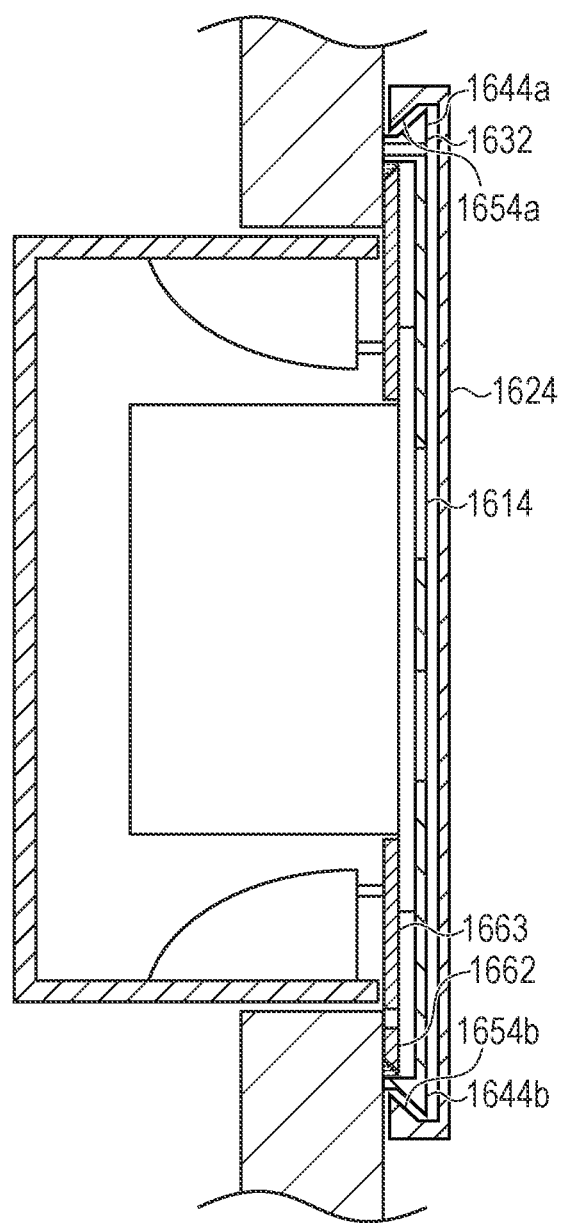

FIG. 16C depicts the additional cover plate 1624 installed over the cover plate 1614. As shown in this embodiment, the spring cleat 1632 on the cover plate 1614 is positioned on a side of the cover plate 1614 that is opposite to the spring cleat 1662 on the shim 1663. This configuration may permit the additional cover plate 1624 to be installed or uninstalled without significantly moving the cover plate 1614 or otherwise interfering with the engagement and/or biasing force of the spring cleat 1662 on the cover plate 1614. Stated another way, the operation of installing the cover plate 1614 on the shims may include an upward force on the spring cleat 1662 in order to deflect the spring cleat 1662 of the shim 1663, while the operation of installing the additional cover plate 1624 onto the cover plate 1614 includes a downward force on the spring cleat 1632 of the cover plate 1614. Thus, the additional cover plate 1624 can be attached to and detached from the cover plate 1614 without deflecting the spring cleat 1662 of the shim and thus without disrupting the attachment of the cover plate 1614 to the shims.

Figure 17A:
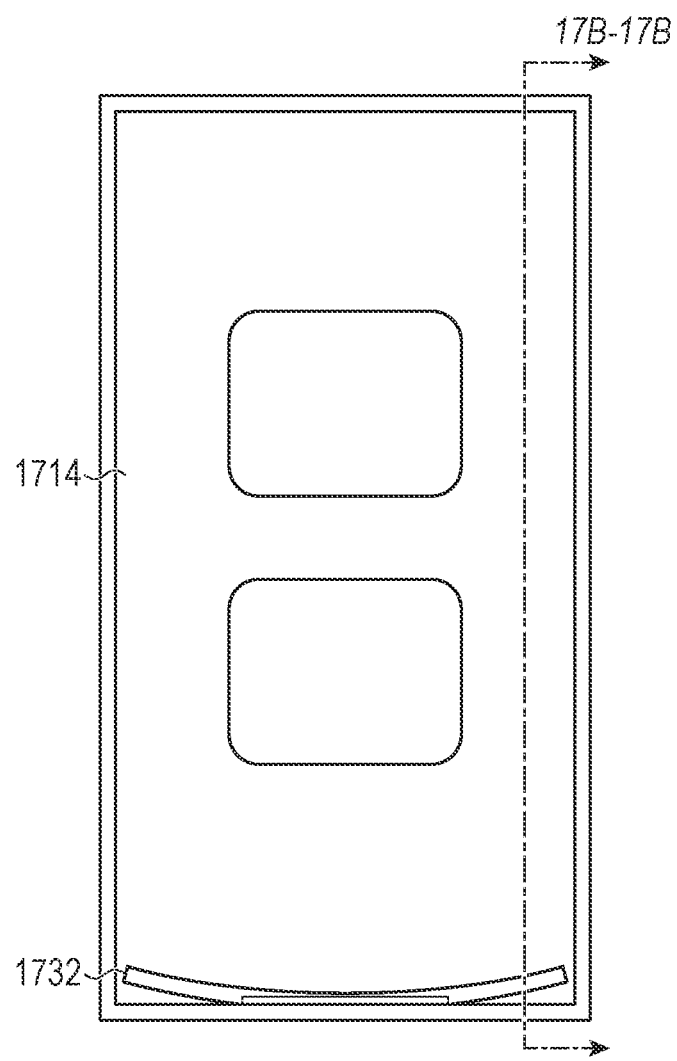
FIGS. 17A-17B illustrate an example of a cover plate having a spring cleat within its inside surface and configured to be installed to the shims.
Figure 17B:
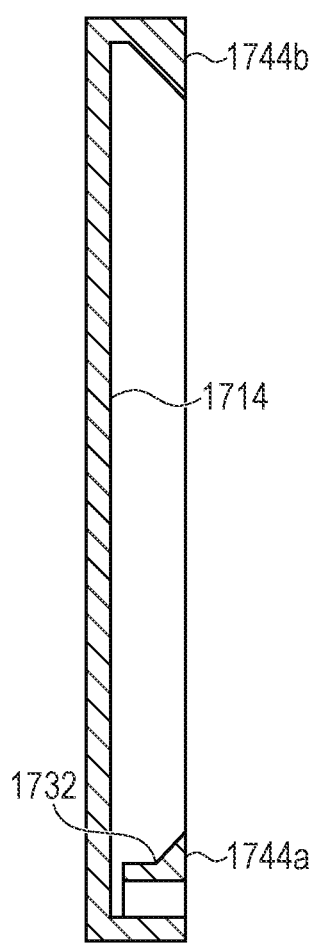

FIGS. 17A-17B depict another embodiment of a cover plate that may be coupled to a wall via shims as described herein. In this example, the cover plate 1714 comprises a biasing member 1732, instead of the shim including the biasing member as shown and described with respect to FIGS. 8A-8D. As shown in FIG. 17B, the biasing member 1732 may be positioned along a first side of the cover plate 1714 and defines an engagement feature (e.g., an angled surface) that is configured to engage a corresponding engagement feature (e.g., an angled surface) on a shim. The side of the cover plate 1714 opposite of the biasing member 1732 (e.g., a top of the cover plate 1714) may define an additional engagement feature configured to engage a corresponding engagement feature of another shim. Under this embodiment, the first and second shims (e.g., FIG. 8A-8D), may define engagement members without a spring cleat. To install, a user may engage the biasing member 1732 of the cover plate 1714 with the first shim (e.g., the first engagement feature 1744*a* may engage a corresponding engagement feature of the first shim) to deflect the biasing member 1732, and then engage the second engagement feature 1744*b* of the cover plate with the second shim, in a manner similar to that described with respect to FIGS. 8A-8D.

Many of the embodiments described and illustrated above are directed to electrical boxes with a width of one gang. However, it is appreciated that any length of gang may be utilized in accordance with the provided disclosure. For example, a two-gang electrical box may have longer and/or additional magnetic shims and a corresponding magnetic cover plate may have multiple openings, longer and/or additional magnets, and so on. Other gang lengths, such as three gang, four gang, and so on, may additionally be used in accordance with the provided disclosure.

Further, though switch assemblies and electrical receptacles are described as examples of electrical assemblies, any electrical assembly may be used in accordance with the provided disclosure. For example, control devices (e.g., a thermostat) may be used as an electrical assembly and a magnetic cover plate may be positioned around such control devices.

Accordingly, one may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A cover plate mounting assembly comprising:
   a first shim configured to be positioned between an electrical box and an electrical assembly, the first shim defining:
      a first wing region;
      a second wing region; and
      a first recessed area positioned between the first wing region and the second wing region and defining a first thinned portion configured to accommodate a first end of the electrical assembly;
   a second shim configured to be positioned between the electrical box and the electrical assembly, the second shim defining:
      a third wing region;
      a fourth wing region; and
      a second recessed area positioned between the third wing region and the fourth wing region and defining a second thinned portion configured to accommodate a second end of the electrical assembly, the second end opposite from the first end; and
   a cover plate assembly defining at least one hole configured to receive a portion of the electrical assembly therethrough and comprising a magnetic attachment system configured to couple with the first shim and with the second shim,
   wherein:
      the first shim comprises a spring cleat having a compressed state and an uncompressed state, the spring cleat configured to engage a rim of the cover plate assembly;
      the cover plate assembly is configured to compress the spring cleat during coupling of the cover plate assembly to the first shim, thereby transitioning the spring cleat from the uncompressed state to the compressed state; and
      in the compressed state, the spring cleat is configured to inhibit decoupling of the cover plate assembly from the first shim through frictional and biasing forces.

2. The cover plate mounting assembly of claim 1, further comprising a locking pin positioned within a locking cavity of the cover plate assembly, wherein:
   the first shim further comprises a locking magnet positioned at a base portion of the first shim; and
   the locking magnet attracts the locking pin to cause the locking pin to engage the first shim, thereby securing the cover plate assembly to the first shim.

3. The cover plate mounting assembly of claim 2, wherein:
   the first shim is retained with the cover plate assembly when the locking pin is in a locked position; and
   the locking pin transitions to an unlocked position when an external magnetic force is applied to the locking pin.

4. The cover plate mounting assembly of claim 1, wherein:
   the electrical assembly is coupled to the electrical box by at least one screw;
   the cover plate assembly defines a screw cavity formed into a rear surface of the cover plate assembly, the screw cavity configured to receive a portion of the at least one screw therein; and
   the screw cavity is a blind hole.

5. The cover plate mounting assembly of claim 1, wherein the electrical assembly includes at least one of an electrical switch or an electrical receptacle.

6. The cover plate mounting assembly of claim 1, wherein the spring cleat is configured to draw the cover plate assembly towards the electrical box.

7. The cover plate mounting assembly of claim 1, wherein the spring cleat is configured to draw the cover plate assembly into contact with a wall to which the cover plate mounting assembly is coupled.

8. A shim system configured to be positioned between an electrical box and an electrical assembly, the shim system comprising:
   a first shim defining:
      a first wing region;
      a second wing region; and
      a first recessed area positioned between the first wing region and the second wing region and defining a first thinned portion configured to receive a first end of the electrical assembly, wherein the first shim comprises a spring cleat having a compressed state and an uncompressed state, wherein the spring cleat transitions from the uncompressed state to the compressed state when a cover plate assembly is coupled to the shim system; and
   a second shim defining:
      a third wing region;
      a fourth wing region;
      a second recessed area positioned between the third wing region and the fourth wing region and defining a second thinned portion configured to receive a second end of the electrical assembly; and
   a first engagement feature configured to engage with a second engagement feature of a cover plate assembly, the spring cleat configured to bias the first engagement feature against the second engagement feature when the cover plate assembly is coupled to the shim system.

9. The shim system of claim 8, wherein:
   the first wing region comprises a first magnet; and
   the second wing region comprises a second magnet.

10. The shim system of claim 8, wherein:
    the first wing region comprises a first magnetic component formed from a ferromagnetic material; and
    the second wing region comprises a second magnetic component formed from the ferromagnetic material.

11. The shim system of claim 8, further defining a notch configured to permit access to a screw coupling the electrical assembly to the electrical box.

12. The shim system of claim 8, wherein the electrical assembly includes at least one of an electrical switch or an electrical receptacle.

13. The shim system of claim 8, wherein the spring cleat defines a first angled surface configured to engage a second angled surface of the cover plate assembly.

14. The shim system of claim 13, wherein the first angled surface of the spring cleat is configured to draw the cover plate assembly into contact with a wall in which the electrical box is located.

15. A cover plate mounting assembly comprising:
- a cover plate configured to cover an electrical box and at least a portion of an electrical assembly and defining:
  - a cover portion defining an exterior side of the cover plate and an interior side of the cover plate opposite the exterior side;
  - a first engagement feature positioned at a first edge of the cover portion along the interior side of the cover plate; and
  - a second engagement feature positioned at a second edge of the cover portion along the interior side of the cover plate;
- a first shim configured to be positioned between the electrical box and a first mounting tab of the electrical assembly, the first shim defining a third engagement feature configured to engage the first engagement feature of the cover plate; and
- a second shim configured to be positioned between the electrical box and a second mounting tab of the electrical assembly, the second shim comprising:
  - a base portion; and
  - a biasing member coupled to the base portion and configured to engage the second engagement feature to impart a biasing force to the cover plate to force the third engagement feature into engagement with the first engagement feature.

16. The cover plate mounting assembly of claim 15, wherein the second shim comprises a unitary polymer structure defining both the biasing member and the base portion.

17. The cover plate mounting assembly of claim 15, wherein the second shim comprises a unitary metal structure defining both the biasing member and the base portion.

18. The cover plate mounting assembly of claim 15, wherein:
- the first engagement feature defines a first angled surface; and
- the second engagement feature defines a second angled surface configured to contact the first angled surface.

19. The cover plate mounting assembly of claim 15, wherein:
- the cover plate defines an attachment mechanism; and
- the cover plate mounting assembly further comprises an additional cover plate configured to releasably engage the attachment mechanism to releasably couple the additional cover plate to the cover plate.

20. The cover plate mounting assembly of claim 15, wherein:
- the biasing member is a first biasing member;
- the cover plate defines:
  - a fourth engagement feature positioned at the second edge of the cover portion along the exterior side of the cover plate; and
  - a second biasing member positioned at the first edge of the cover portion along the exterior side of the cover plate;
- the cover plate mounting assembly further comprises:
  - an additional cover plate defining:
    - a barrier portion defining an exterior side of the additional cover plate and an interior side of the additional cover plate;
    - a fifth engagement feature positioned at a first edge of the barrier portion along the interior side of the additional cover plate and configured to engage the fourth engagement feature of the cover plate; and
    - a sixth engagement feature positioned at a second edge of the barrier portion along the interior side of the additional cover plate and configured to engage the second biasing member; and
- the second biasing member is configured to impart an additional biasing force to the additional cover plate to force the fifth engagement feature into engagement with the fourth engagement feature.

* * * * *